US007450105B2

(12) United States Patent
Nakamura et al.

(10) Patent No.: US 7,450,105 B2
(45) Date of Patent: Nov. 11, 2008

(54) DISPLAY DEVICE

(75) Inventors: Takashi Nakamura, Kumagaya (JP); Hirotaka Hayashi, Fukaya (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 686 days.

(21) Appl. No.: 10/813,055

(22) Filed: Mar. 31, 2004

(65) Prior Publication Data

US 2004/0189566 A1 Sep. 30, 2004

(30) Foreign Application Priority Data

Mar. 31, 2003 (JP) ............................ 2003-096373
Mar. 31, 2003 (JP) ............................ 2003-096432
Mar. 31, 2003 (JP) ............................ 2003-096519

(51) Int. Cl.
*G09G 3/36* (2006.01)
*G06K 9/00* (2006.01)

(52) U.S. Cl. ...................................... 345/104; 382/318

(58) Field of Classification Search .................. 345/87, 345/92, 98, 102, 104, 205, 207; 382/318
See application file for complete search history.

(56) References Cited

U.S. PATENT DOCUMENTS 5,966,112 A * 10/1999 Katagiri et al. ............. 345/104
6,243,069 B1 * 6/2001 Ogawa et al. ............... 345/102
6,791,520 B2 * 9/2004 Choi ........................... 345/89
2004/0085458 A1 * 5/2004 Yanof et al. .............. 348/223.1
2004/0204060 A1 * 10/2004 Makinouchi et al. ..... 455/556.1

* cited by examiner

*Primary Examiner*—Amare Mengistu
*Assistant Examiner*—Randal Willis
(74) *Attorney, Agent, or Firm*—Oblon, Spivak, McClelland, Maier & Neustadt, P.C.

(57) ABSTRACT

A display device, comprising: a pixel array unit having display elements formed in vicinity of intersections of signal lines and scanning lines arranged in length and breadth, image pickup units and an output unit which outputs binary data corresponding to image picked up by said image pickup unit; a image pickup device provided separate from said image pickup unit; a first image processing unit configured to generate multiple gradation data based on multiple binary data picked up by said image pickup units based on multiple image pickup conditions; and a second image processing unit configured to receive either the image pickup data picked up by said image pickup device or the multiple gradation data generated by said first image processing unit, to conduct a prescribed image processing.

9 Claims, 22 Drawing Sheets

-Prior Art-

REPEAT 12 TIMES (LIST OF PARAMETERS)

| | 1/12 | 2/12 | 3/12 | 4/12 | 5/12 | 6/12 | 7/12 | 8/12 | 9/12 | 10/12 | 11/12 | 12/12 |
|---|---|---|---|---|---|---|---|---|---|---|---|---|
| gate1 | 1 | | | | 2 | | | | 3 | | | |
| gate4 | 4 | | | | 5 | | | | 6 | | | |
| gate238 | 238 | | | | 239 | | | | 240 | | | |
| HSW[3:0] | 1,0,0,0 | 0,1,0,0 | 0,0,1,0 | 0,0,0,1 | 1,0,0,0 | 0,1,0,0 | 0,0,1,0 | 0,0,0,1 | 1,0,0,0 | 0,1,0,0 | 0,0,1,0 | 0,0,0,1 |

-Prior Art-

DISPLAY DEVICE

CROSS REFERENCE TO RELATED APPLICATIONS

This application claims benefit of priority under 35 USC § 119 to Japanese Patent Applications No. 2003-96373, No. 2003-96432 and No. 2003-96519, filed on Mar. 31, 2003, the entire contents of which are incorporated by reference herein.

BACKGROUND OF THE INVENTION

1. Field of the Invention

The present invention relates to a display device having an image acquisition function.

2. Related Background Art

A liquid crystal display is typically comprised of an array substrate having signal lines, scanning lines and pixel TFTs arranged in matrix, and a drive circuit for driving the signal lines and the scanning lines. With an integrated circuit technology drastically advanced in recent years, a processing technology forming a part of the driving circuits on the array substrate has been put into practical use. Thanks to the technology, it became possible to downsize and lighten the entire liquid crystal display. Such kind of liquid crystal display is widely used as a display device of various portable equipments such as a portable phone and a notebook PC.

There is proposed a display device having image acquisition function, which has closely assembled area sensors (see Japanese Patent Laid-open Nos. 292276/2001 and 339640/2001).

In this prior art display device having an image acquisition function, the amount of electric charge of the capacitor connected to the sensor is changed in accordance with the amount of light received by the sensor. The image acquisition is conducted by detecting voltages at both ends of the capacitor.

On the other hand, the liquid crystal display controls whether or not a light of a backlight source disposed in back surface passes through liquid crystal pixels to perform arbitrary display. At this time, if a lot of photoelectric conversion elements and circuits are integrated in the pixels, it is impossible to ensure sufficient aperture rate, and to obtain required display luminance.

The luminance of the backlight may be able to raise by some way, but this may, in turn, adversely increase power consumption. In the ordinary display device, it is difficult to provide the pixel with the photoelectric element and the circuit for more than bit. Because of this, unlike a CMOS image sensor and a CCD used for a digital camera and so on, the display device is able to directly produce only 1 bit of image pickup data. In order to convert this data into multi gradation data, it is necessary to perform specific processing in which a lot of image pickup processings are repeated while changing image pickup conditions, and addition/averaging processing is performed at outside. After the gradational differentiation, it is necessary to conduct general image processings such as gradation correction and defective correction conducted by the ordinary digital camera.

Although a dedicated image processing IC may be provided to conduct these processings, it leads to an increase in the manufacturing cost.

SUMMARY OF THE INVENTION

An object of the present invention to provide a display device capable of performing image processings of image obtained by image acquisition in the pixels in simplified configuration and manner.

A display device, comprising:

an array substrate having display elements and output units configured to output binary image pickup data;

an image processing unit configured to have a bidirectional bus for a CPU; and an LCDC which has a bidirectional bus for said CPU.

Furthermore, a display device, comprising:

an array substrate having display elements and output units configured to output binary image pickup data; and an image processing unit configured to have a bidirectional bus for a CPU and a bidirectional bus for an LCDC.

Furthermore, a display device, comprising:

display devices in pixels formed in vicinity of intersections of signal lines and scanning lines disposed in length and breadth;

image pickup units, at least one of said image pickup units being provided corresponding to each pixel, and each conducting image pickup at a prescribed range;

binary data storages which store binary data corresponding to results of image picked up by said image pickup unit; and an array substrate which outputs the binary data in multiple pixels that do not neighbor to each other in at least one direction of length or breadth direction.

Furthermore, a display device, comprising:

a pixel array unit having display elements formed in vicinity of intersections of signal lines and scanning lines arranged in length and breadth, image pickup units and an output unit which outputs binary data corresponding to image picked up by said image pickup unit;

a image pickup device provided separate from said image pickup unit;

a first image processing unit configured to generate multiple gradation data based on multiple binary data picked up by said image pickup units based on multiple image pickup conditions; and a second image processing unit configured to receive either the image pickup data picked up by said image pickup device or the multiple gradation data generated by said first image processing unit, to conduct a prescribed image processing.

Furthermore, a display device, comprising:

display elements in pixels formed in vicinity of intersections of signal lines and scanning lines disposed in length and breadth;

image pickup units, at least one of said image pickup units being provided corresponding to each pixel, and each conducting image pickup at a prescribed range;

binary data storages which store binary data corresponding to results of image picked up by said image pickup unit, and an averaging gradation estimation unit configured to estimate an averaging gradation of whole display screen based on the binary data of the pixels connected to a portion of the scanning lines which do not neighbor to each other.

Furthermore, a display device, comprising:

display devices in pixels formed in vicinity of intersections of signal lines and scanning lines disposed in length and breadth;

image pickup units, at least one of said image pickup units being provided corresponding to each pixel, and each conducting image pickup at a prescribed range;

binary data storages which store binary data corresponding to results of image picked up by said image pickup unit;

a multiple gradation data generator which generates multiple gradation data with first, second third colors based on the binary data with the first, second and third colors picked up by said image pickup unit; and a color composition unit configured to generate image pickup data with a fourth color based on the multiple gradation data with the first, second and third colors.

DRAWINGS

Figure 11:
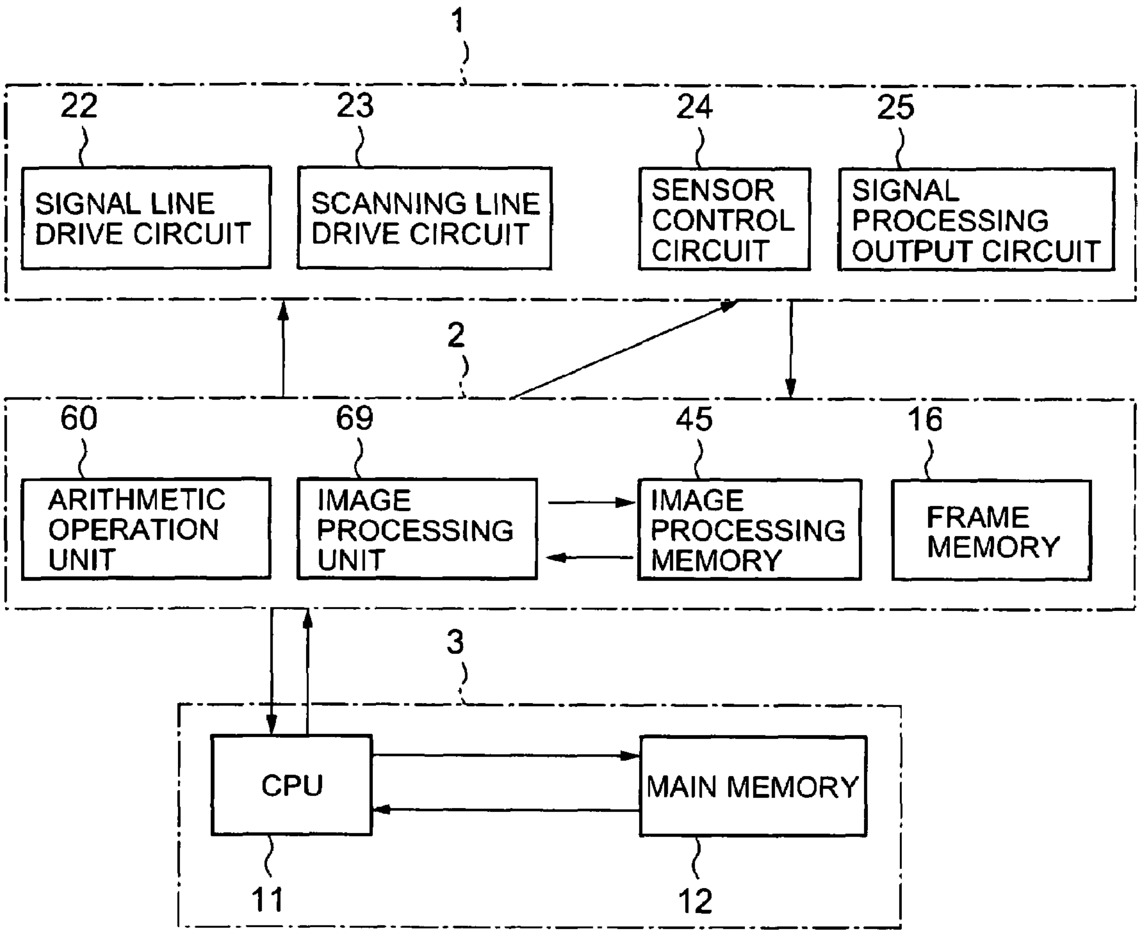

FIG. 11 is a diagram illustrating transmission/reception of the signal between the signal line drive circuit 22, the scanning line drive circuit 23, the image acquisition sensor control circuit 24, and the signal processing/outputting circuit 25 on the LCD substrate 1, the LCD2 the base band LSI 3.

Figure 12:
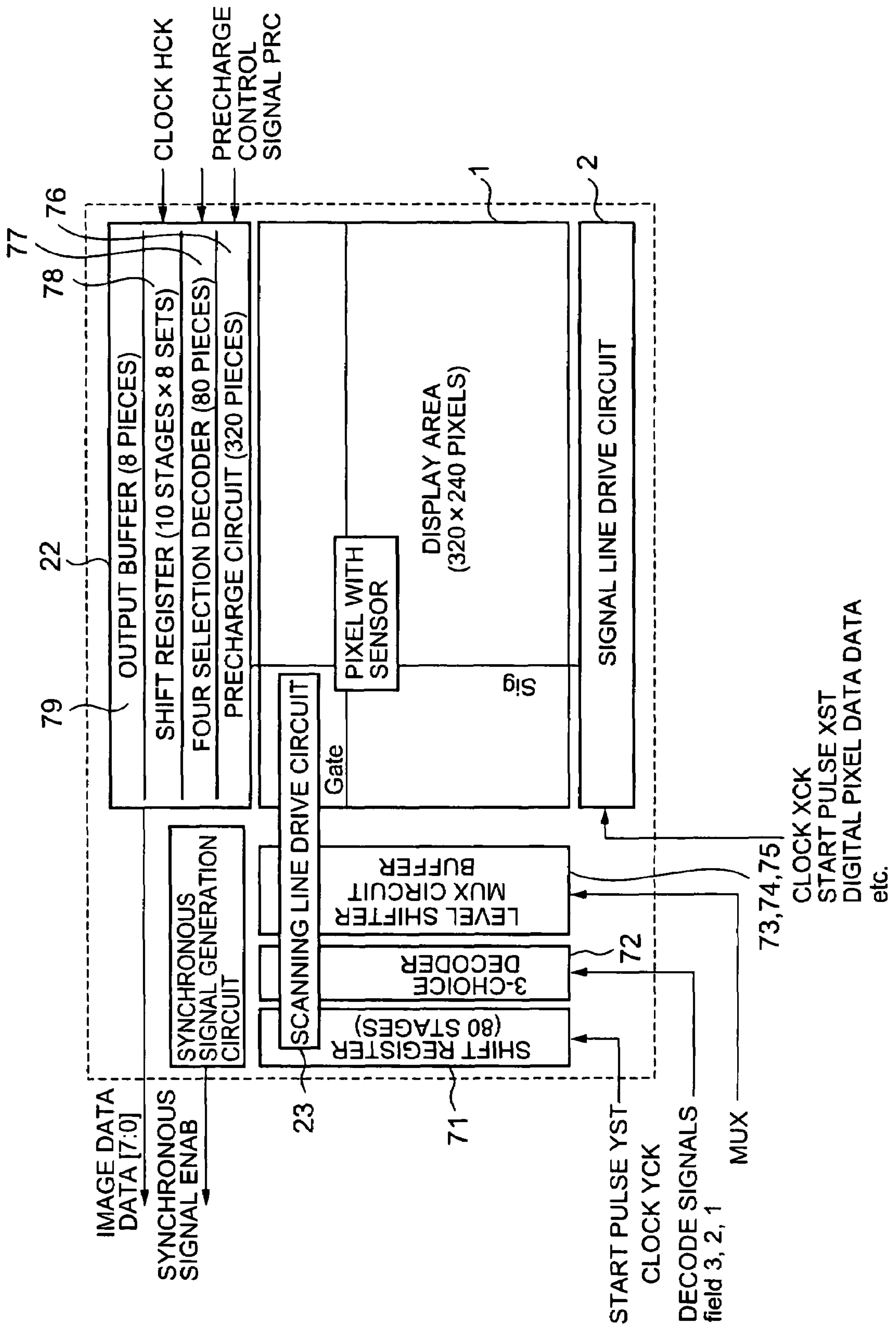

FIG. 12 is a block diagram showing detailed configurations on the glass substrate.

FIG. 13A-13C is a circuit diagram showing an internal configuration of the scanning line drive circuit 23 in FIG. 12.

Figure 14:
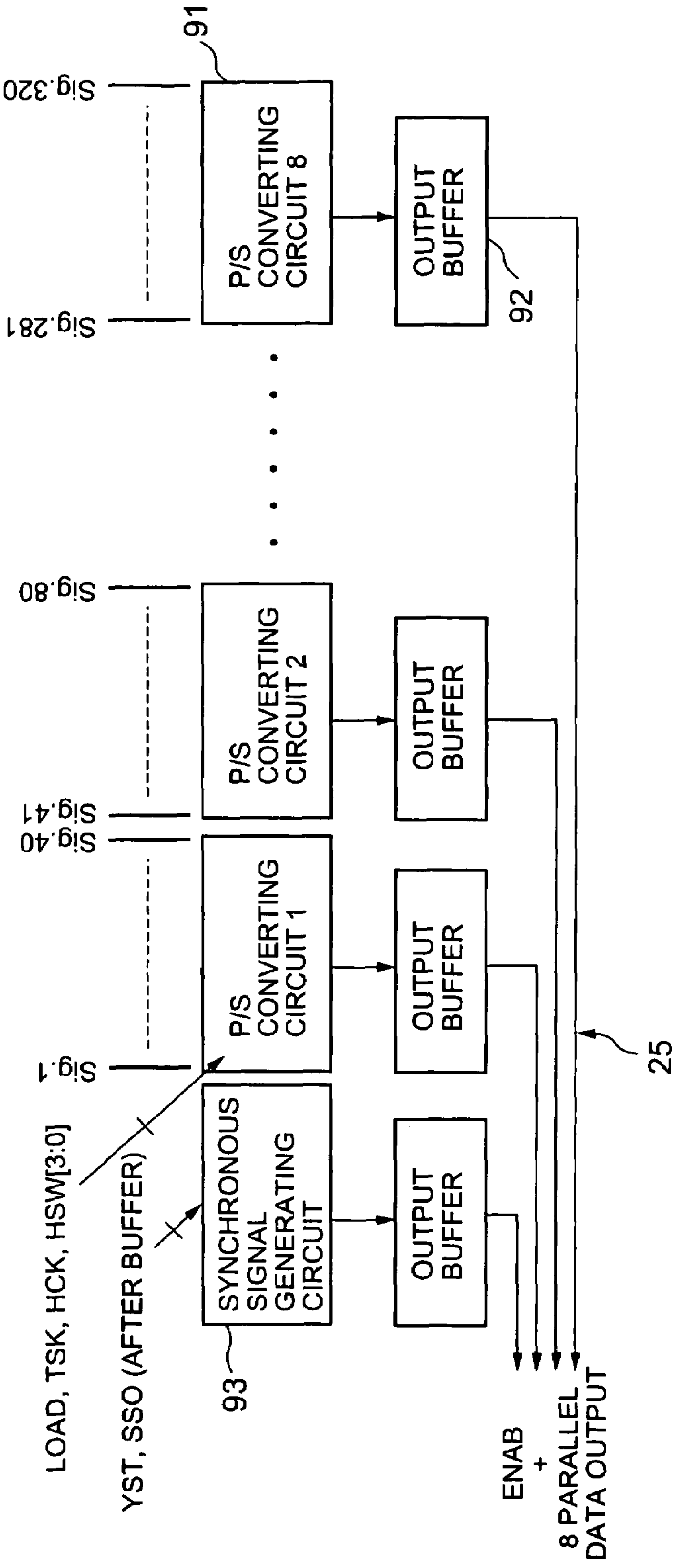

FIG. 14 is a block diagram showing an internal configuration of the signal processing/outputting circuit 25 in FIG. 11.

Figure 15:
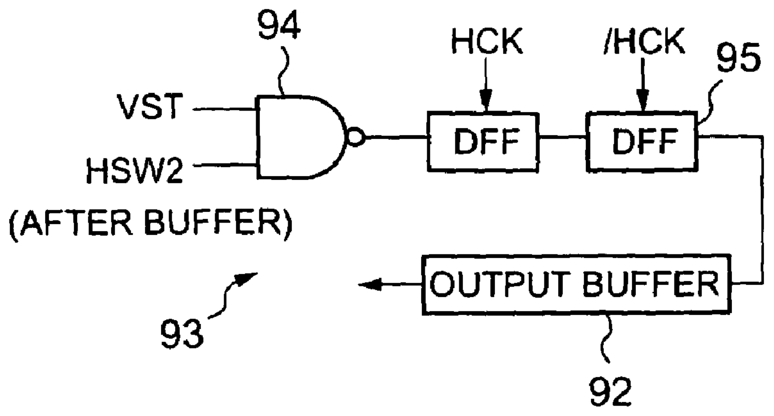

FIG. 15 is a block diagram showing an internal configuration of the synchronizing signal generating circuit 93.

Figure 16:
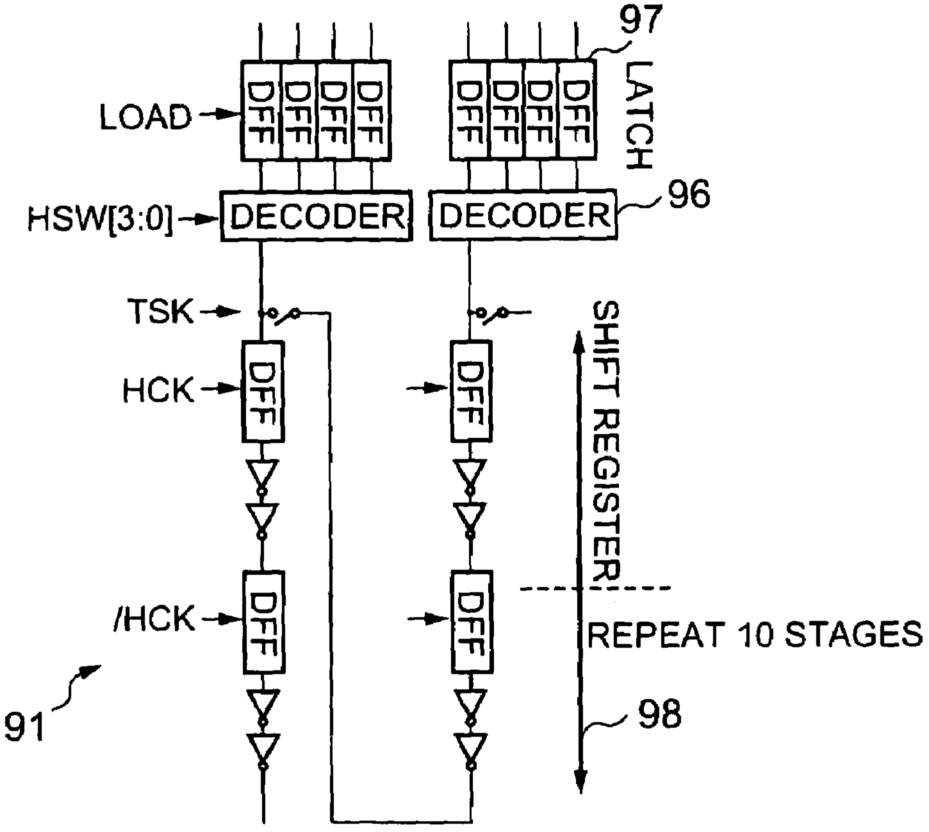

FIG. 16 is a block diagram showing detailed configurations of the P/S converting circuit 91 in FIG. 14.

Figure 17:
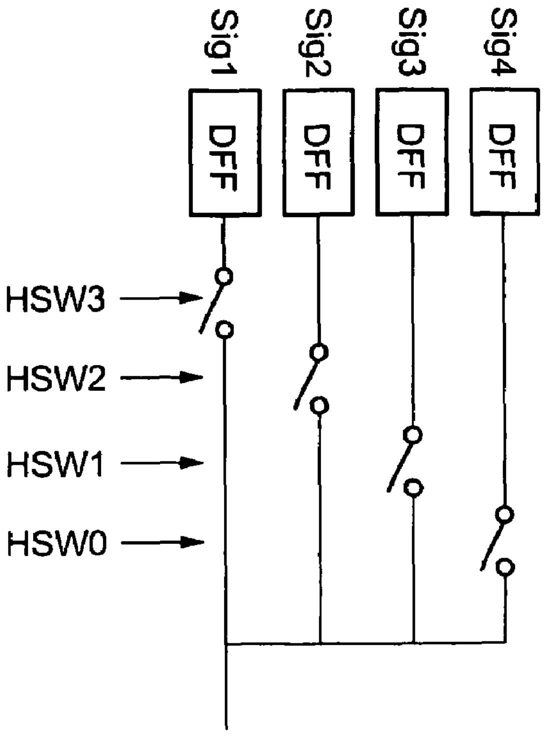

FIG. 17 is a circuit diagram showing internal configuration of a decoder.

Figure 18:
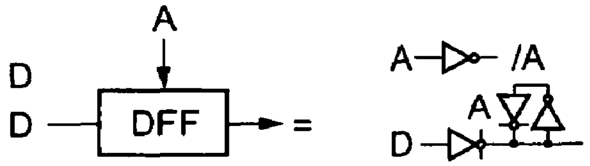

FIG. 18 is a circuit diagram showing internal configuration of a latch.

Figure 19:
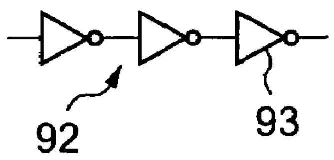

FIG. 19 is a block diagram showing particulars of the output buffer 92.

Figure 20:
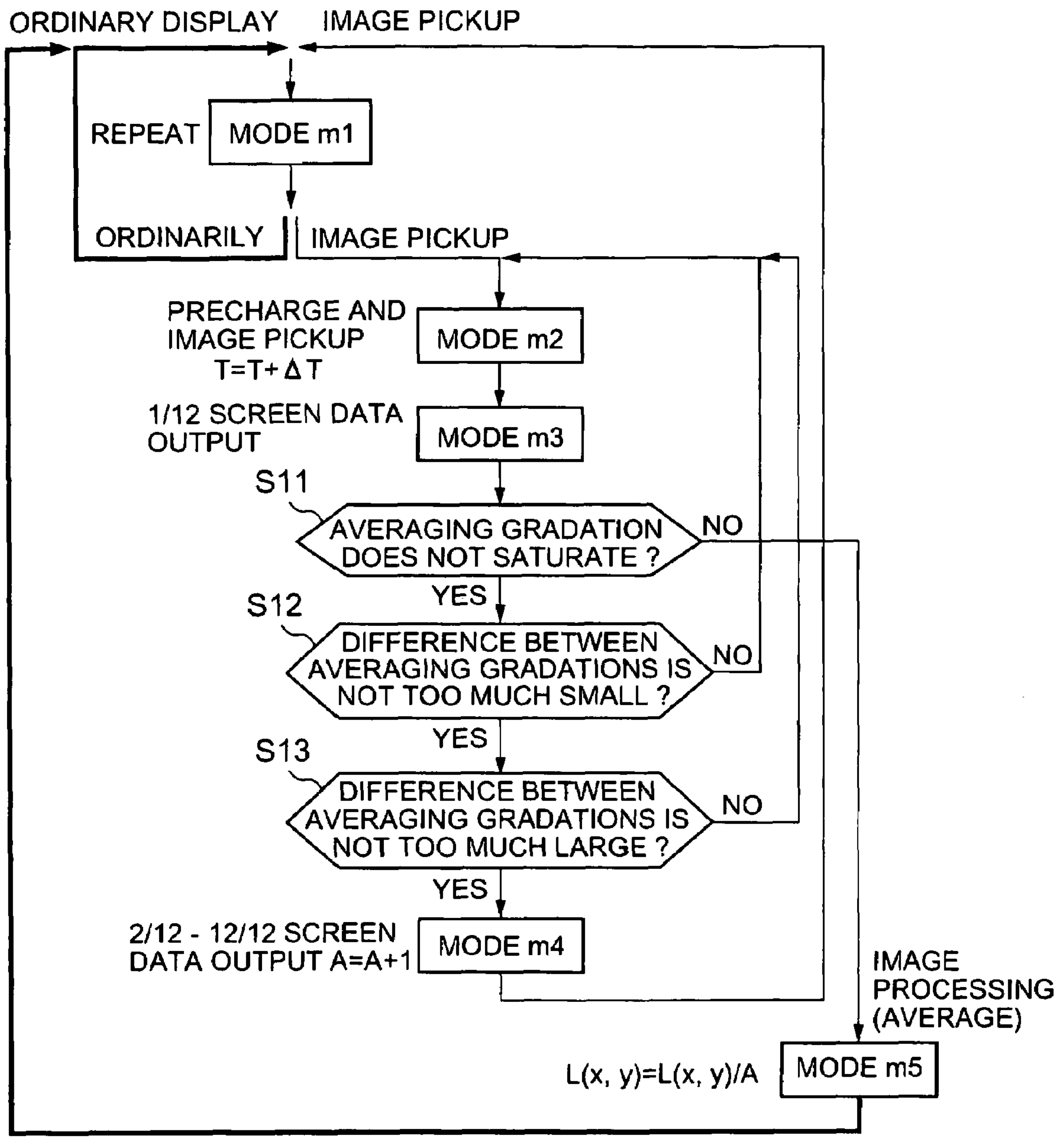

FIG. 20 is a diagram illustrating the operation of the display device of this embodiment.

Figure 21:
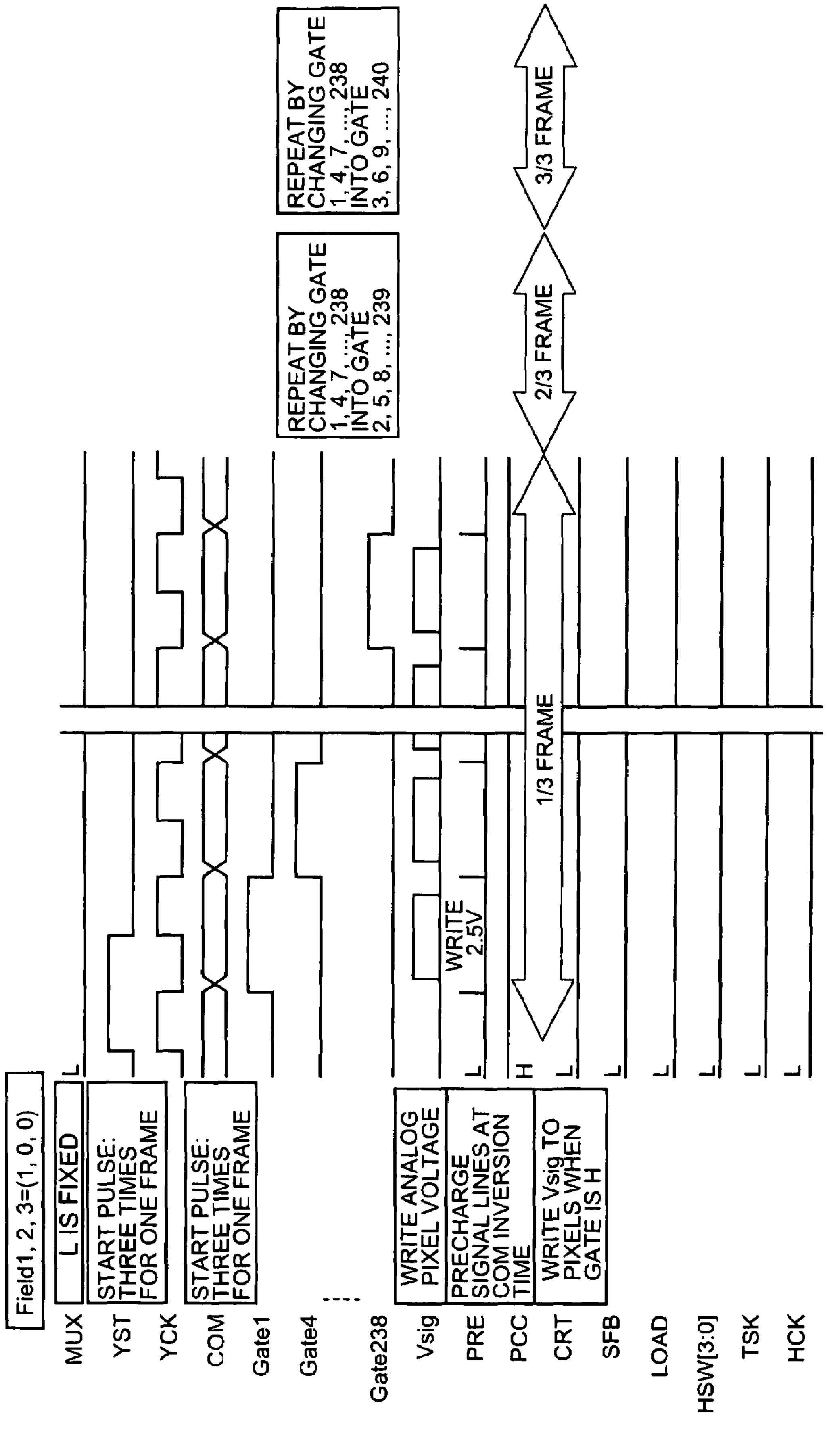

FIG. 21 is a timing chart at the normal display period.

Figure 22:
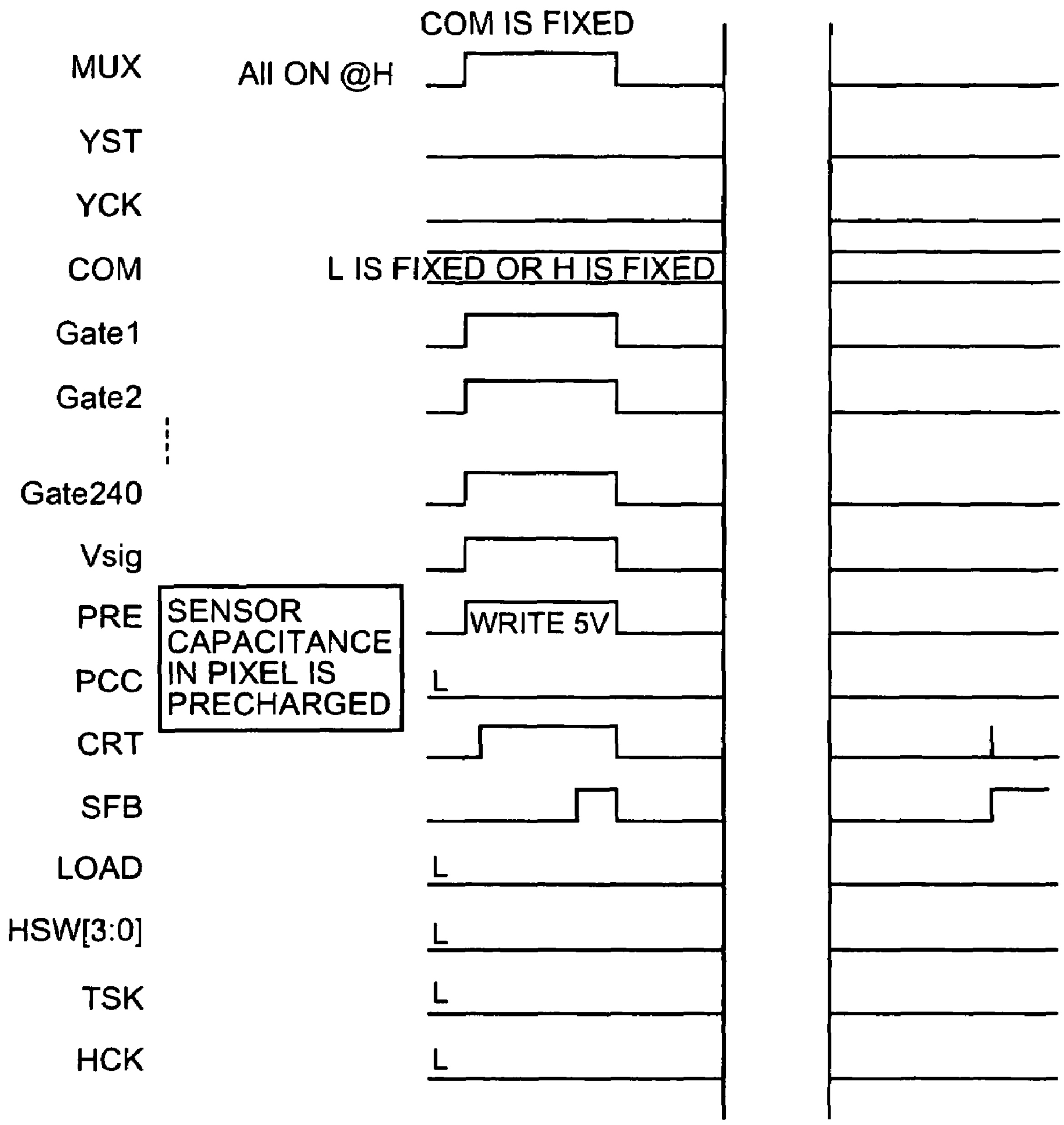

FIG. 22 is a timing chart at pre-charging and image pickup periods.

Figure 23:
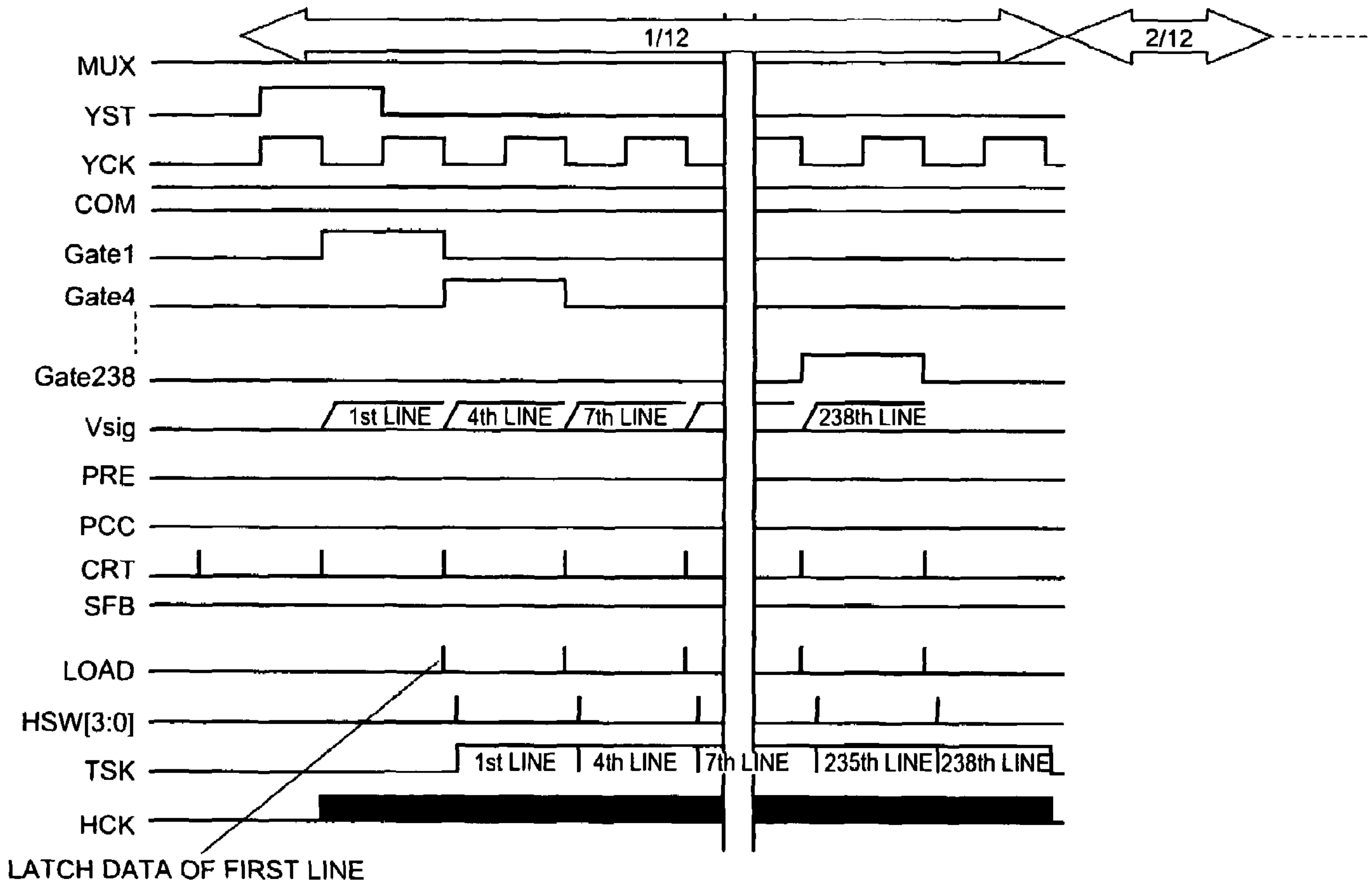

FIG. 23 is a timing chart at image data output period.

Figure 24:
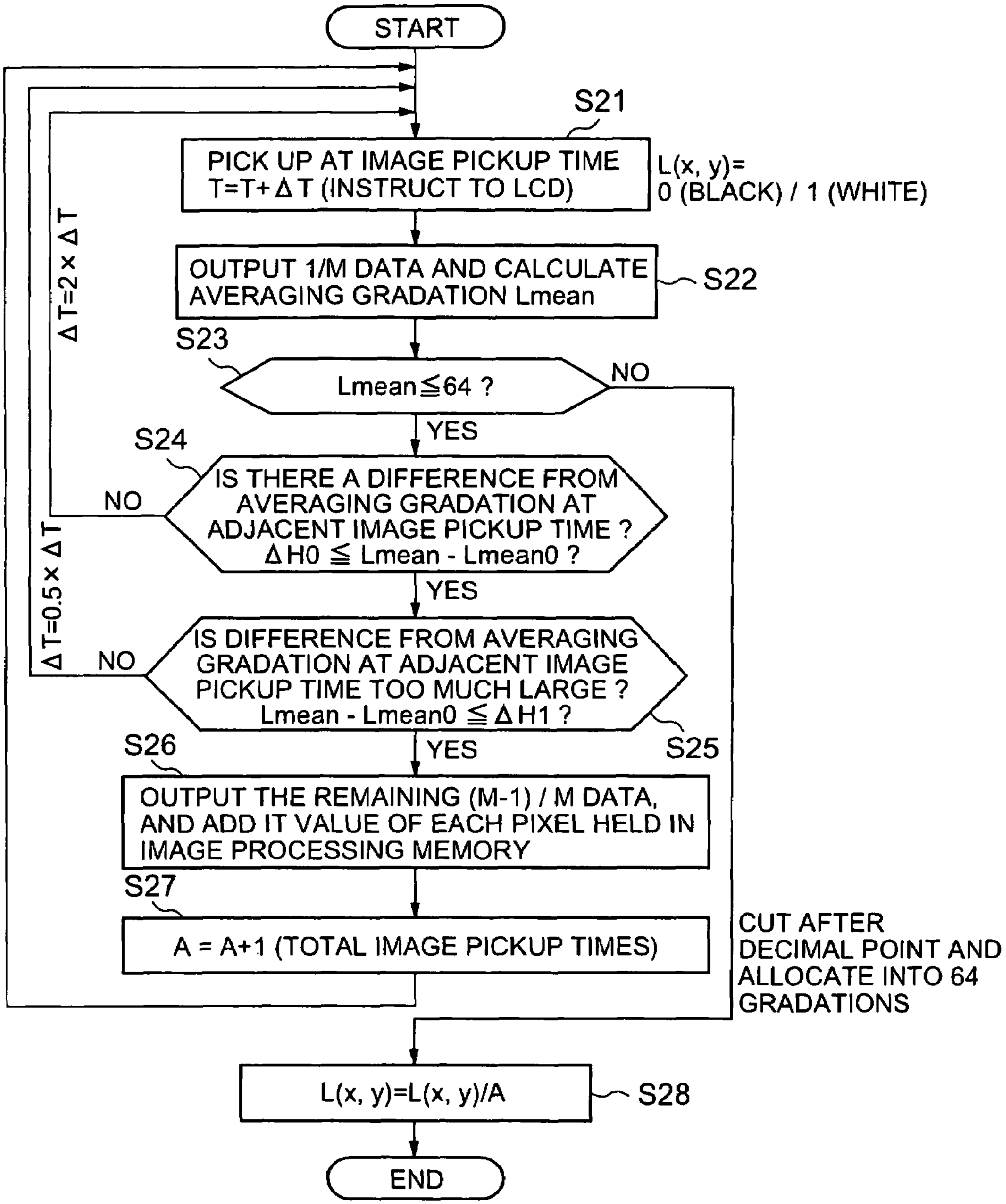

FIG. 24 is a flow chart illustrating the processing operation of the LCD 2.

Figure 25:
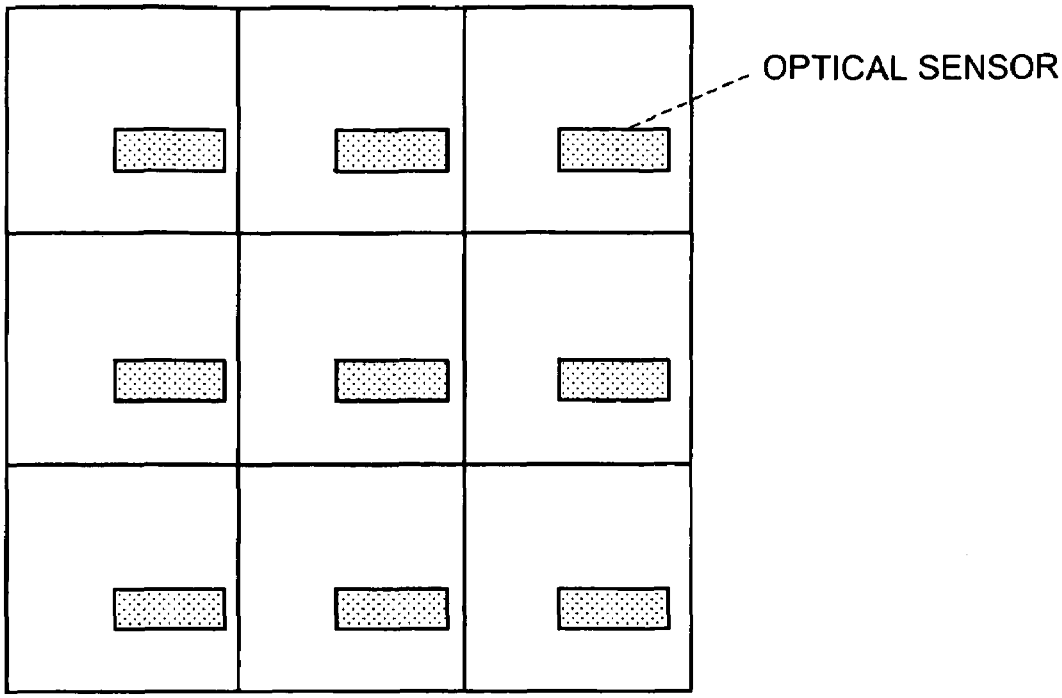

FIG. 25 is a layout diagram of one pixel.

Figure 26:
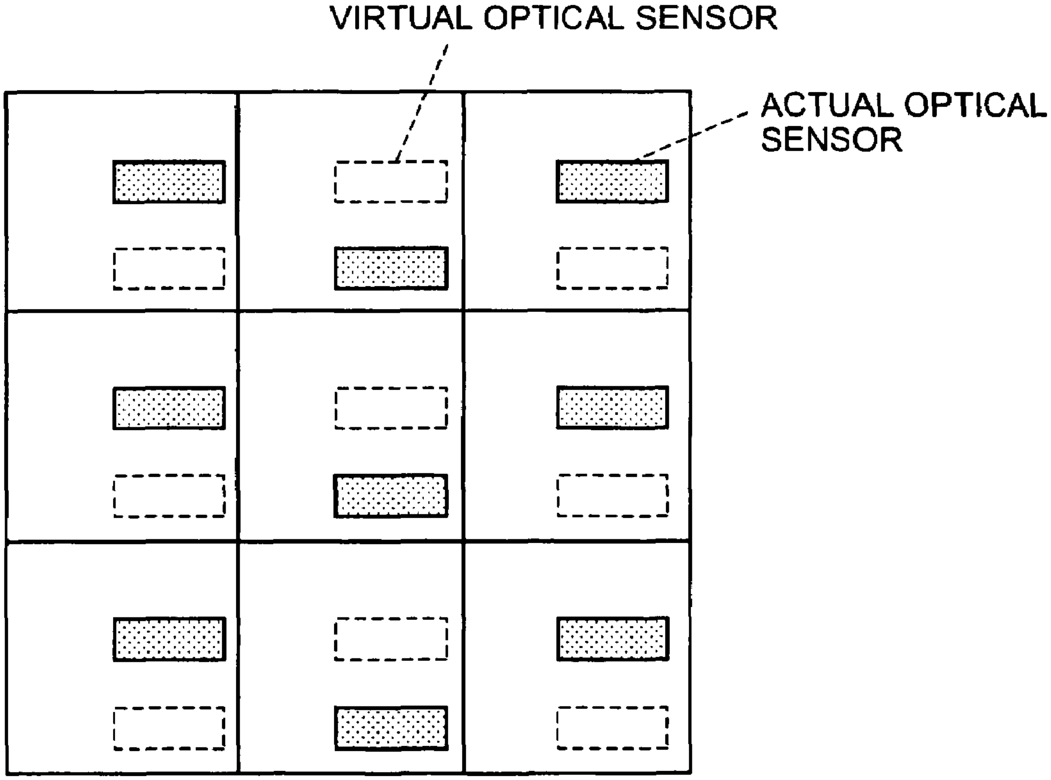

FIG. 26 is a layout diagram in which sensors are arranged in zigzag form.

Figure 27:
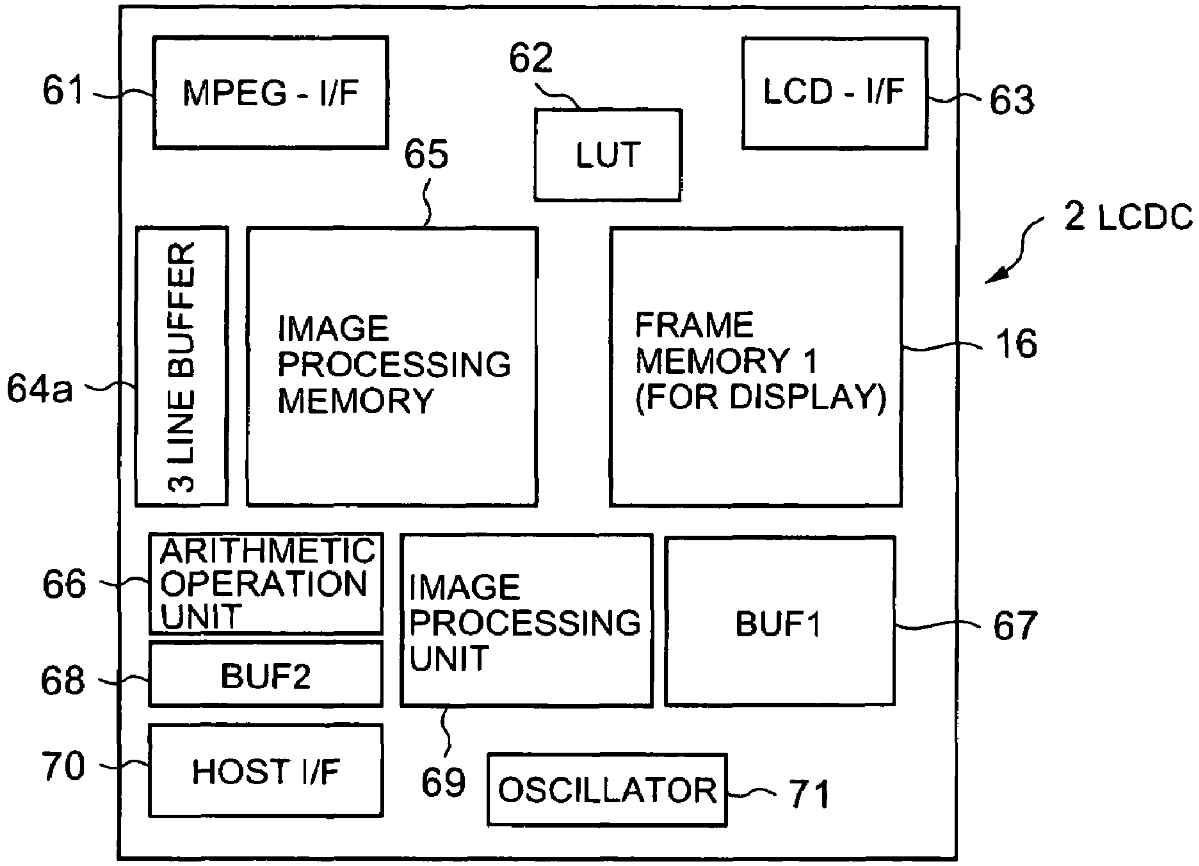

FIG. 27 is a block diagram showing an internal configuration of the LCDC 2 in the second embodiment.

Figure 28:
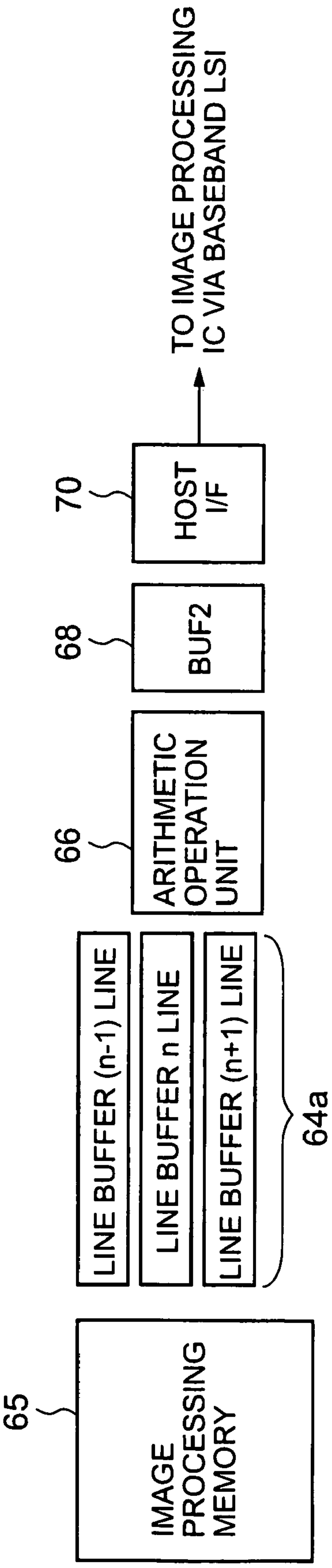

FIG. 28 is a diagram explaining processing operation of the LCDC.

Figure 29:
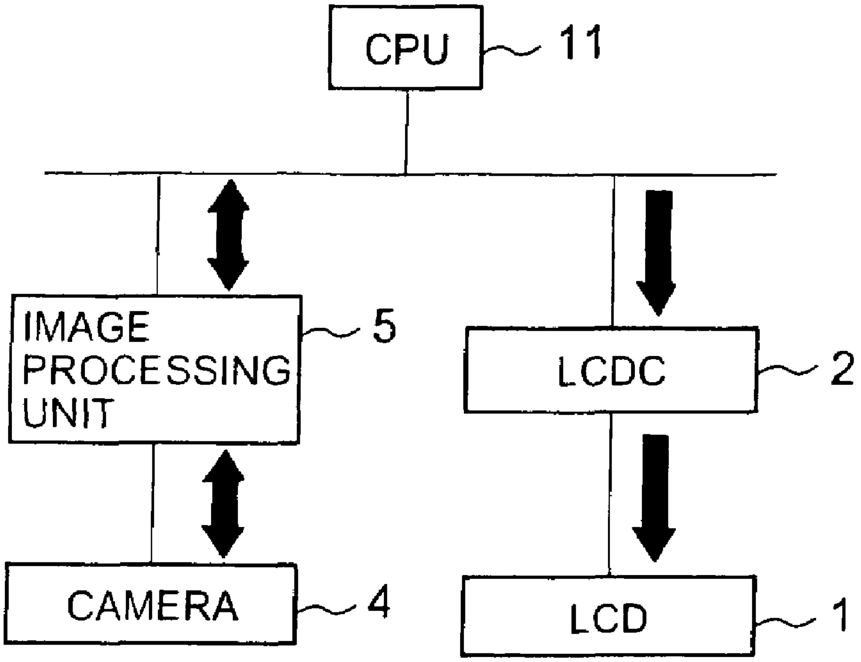

FIG. 29 is a diagram showing conventional system configuration.

Figure 30:
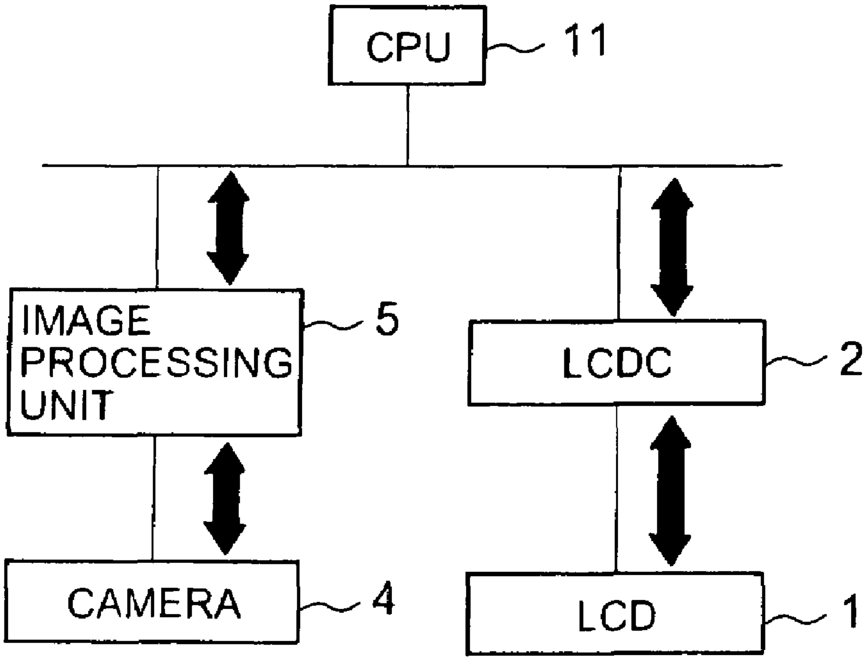

FIG. 30 is a diagram showing system configuration of the display device according to the third embodiment of the present invention.

Figure 31:
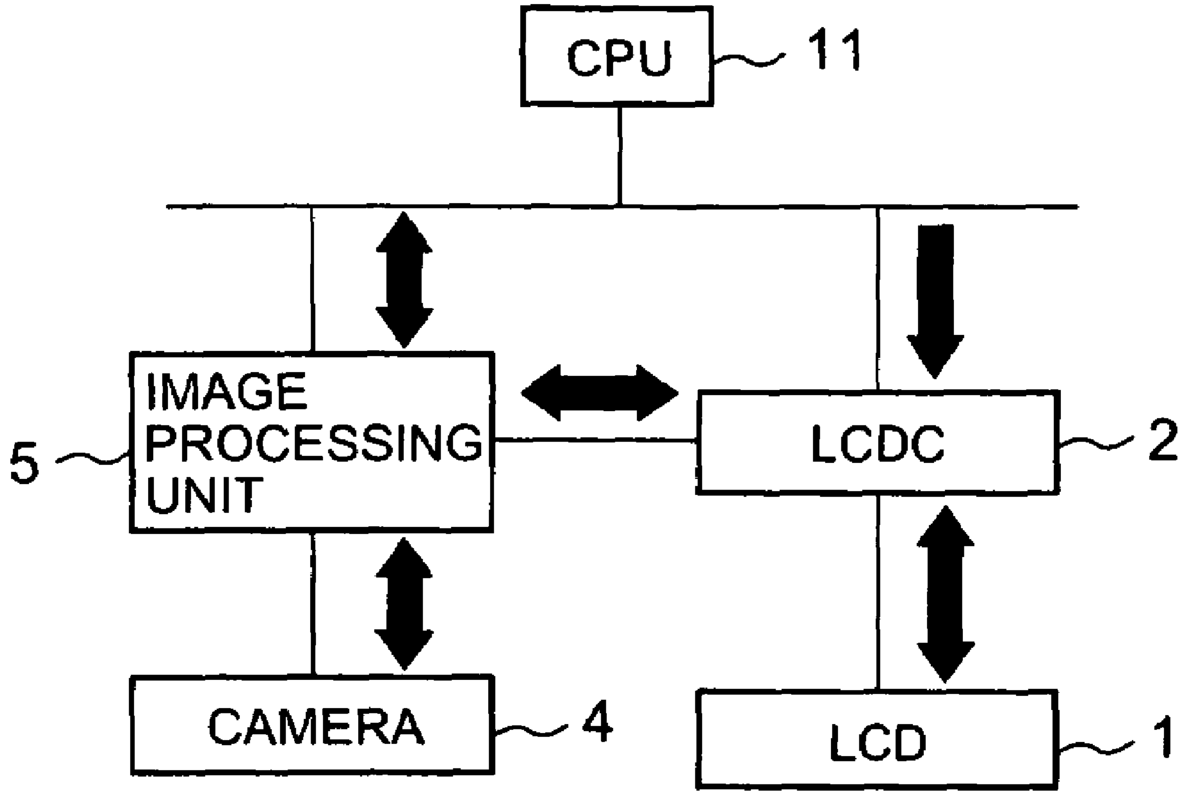

FIG. 31 is a diagram showing system configuration of the display device according to the fourth embodiment of the present invention.

DETAILED DESCRIPTION OF THE INVENTION

A display device according to the present invention will now be described in detail with reference to the accompanying drawings.

Figure 1:
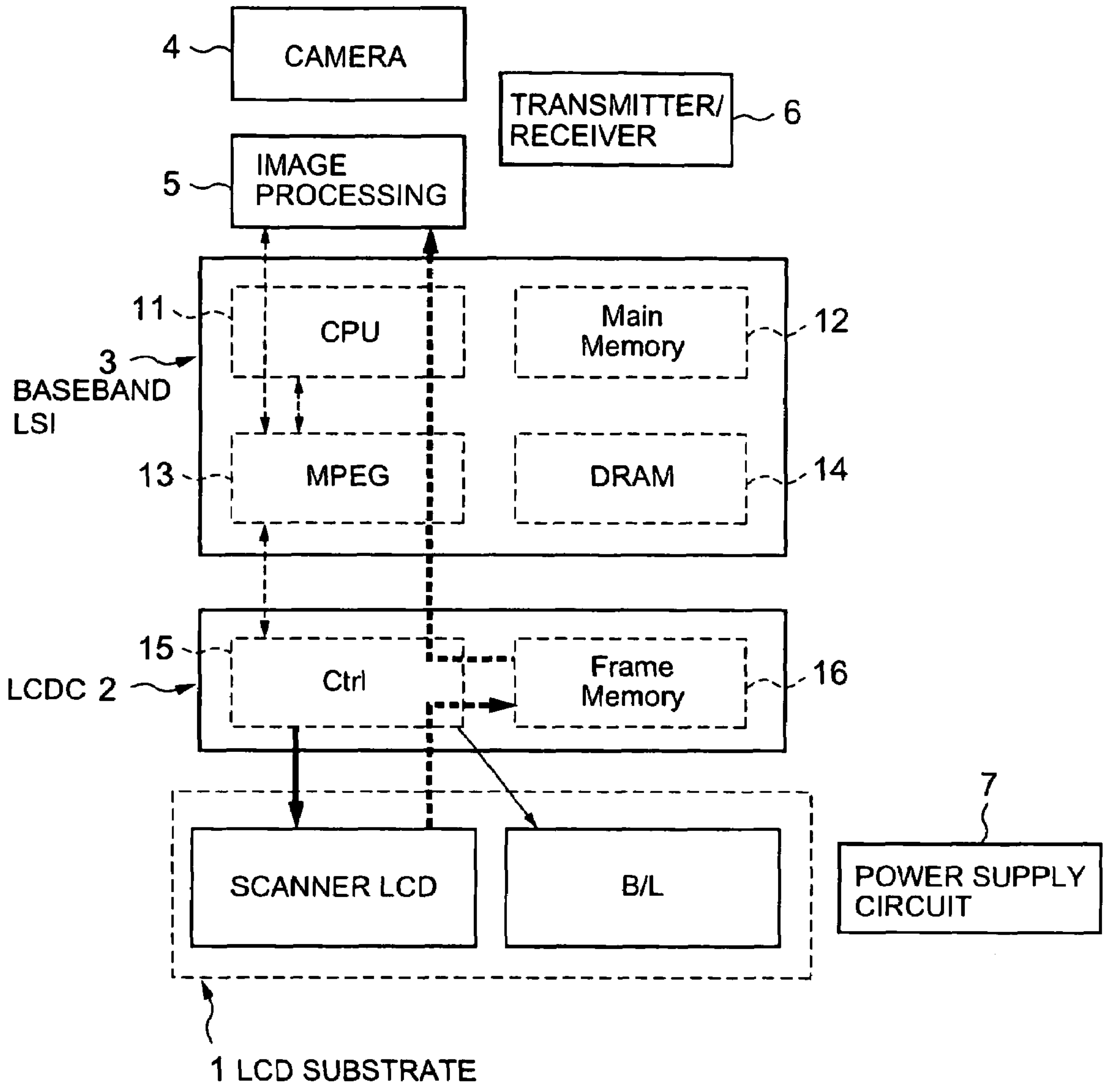
FIG. 1 is a block diagram showing the entire structure of the display device according to one embodiment of the present invention.

FIG. 1 is a block diagram showing the entire structure of the display device according to one embodiment of the present invention, which is a display unit for a cellular phone combined with a camera. The display device in FIG. 1 is comprised of an LCD (liquid crystal display) substrate 1 having pixel TFTs arranged in matrix, a liquid crystal driver IC (referred to as "LCDC" hereinafter) 2 incorporated in the LCD substrate 1, a base band LSI 3, a camera 4, an image processing IC 5 processing image pickup data from the camera 4, a transmitter/receiver unit 6 for signal transmission to and from base stations, and a power supply circuit 7 serving as a battery to other units.

The base band LSI 3 has a CPU 11, a main memory 12, an MPEG processing unit 13, a DRAM 14, an audio signal processing unit (not shown), and the like and controls the whole cellular phone. In FIG. 1, the image processing IC 5 and the transmitter/receiver unit 6 are provided separate from the base band LSI 3, and these components may be packaged in a single chip. Alternatively, the CPU 11 and main memory 12 may also be packaged in a single chip while the remaining components are all integrated in another chip.

The LCDC 2 includes a control unit 15 and a frame memory 16. The camera 4 can be realized by a CCD (charge coupled device) or a CMOS image acquisition sensor.

The LCD substrate 1 in this embodiment has the image acquisition sensor for any single pixel. The LCD substrate 1 has an opposite substrate spaced by a certain distance (e.g., about 5 microns), having a common electrode composed of a transparent electrode such as an ITO. The LCD substrate 1 is sealed by injecting a liquid crystal material between the substrates. Deflecting plates are affixed to both the substrates on their respective outer major surfaces.

Figure 2:
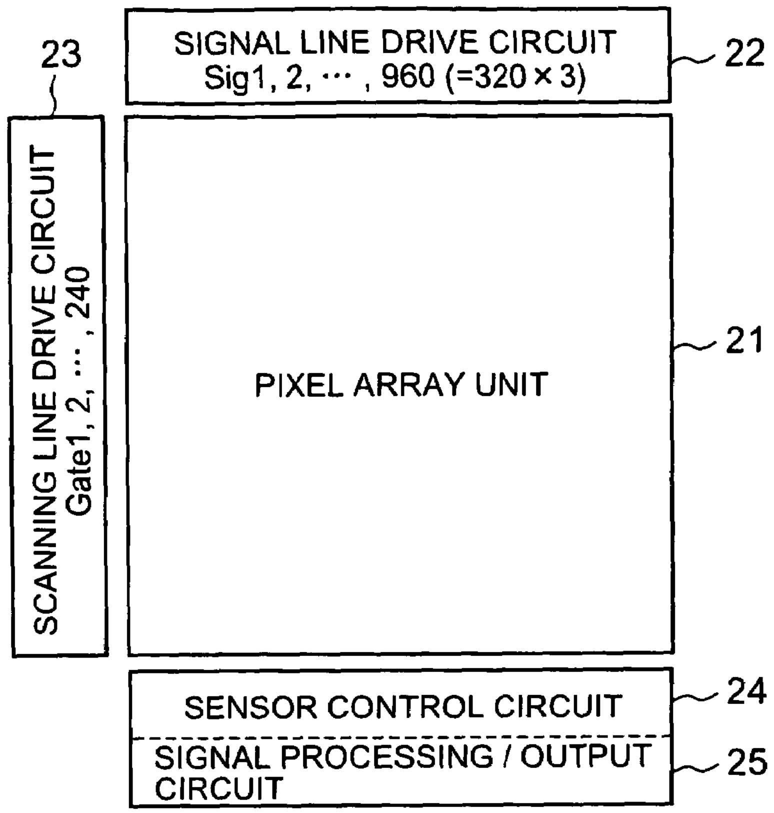
FIG. 2 is a block diagram showing a circuit built in the LCD substrate 1.

FIG. 2 is a block diagram showing a circuit built in the LCD substrate 1. As shown in FIG. 2, superimposed on the LCD substrate 1 are a pixel array unit 21 having signal lines and scanning lines in matrix, a signal line drive circuit 22 for driving the signal lines, a scanning line drive circuit 23 for driving the scanning lines, an image acquisition sensor control circuit 24 for controlling the image acquisition, and a signal processing/outputting circuit 25 for processing signals after the image acquisition. These circuits are made of polysilicon TFTs using the reduced temperature polysilicon technologies. The signal line drive circuit 22 includes a D/A converter circuit converting digital image data into analog voltage signals suitable for driving display elements. The D/A converter circuit may be any of those well known in the art.

Figure 3:
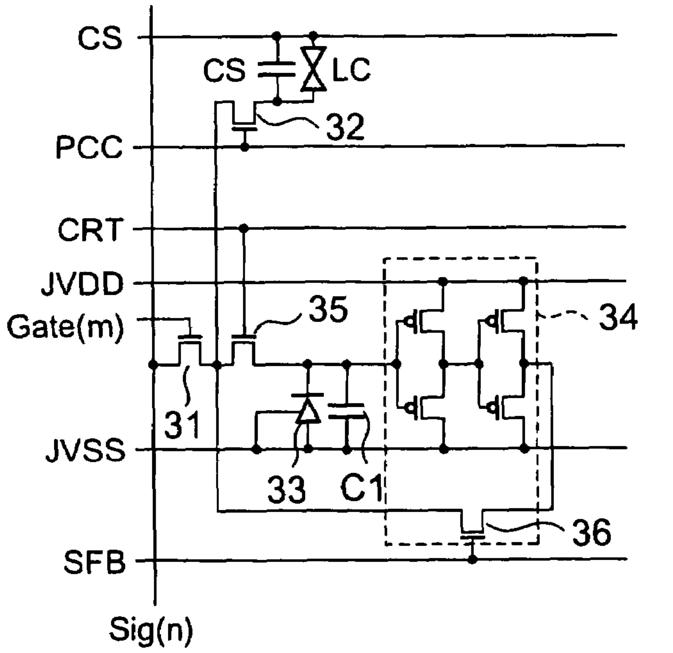
FIG. 3 is a detailed circuit diagram showing 1-pixel segment taken from the pixel array unit 21.
Figure 4:
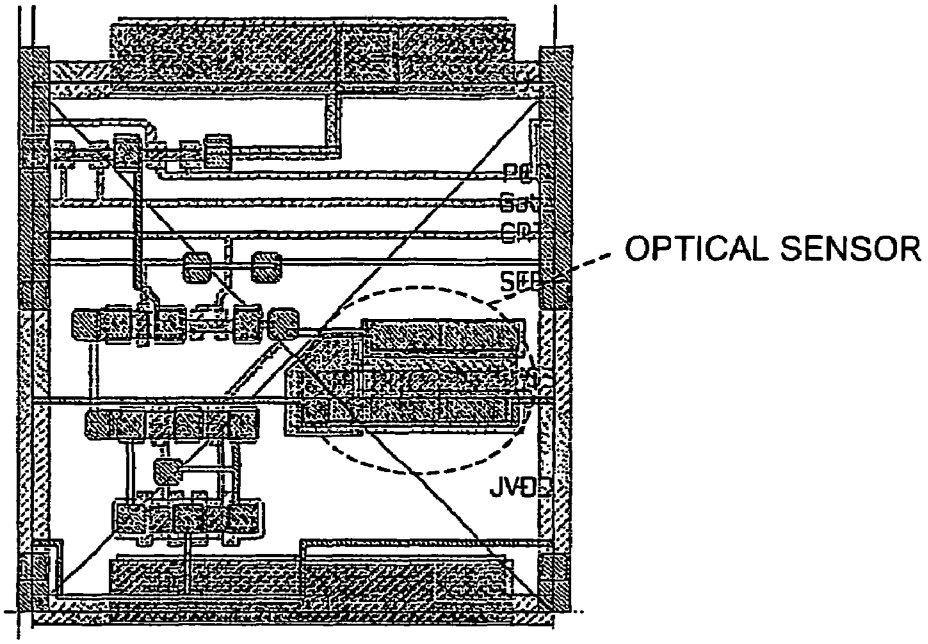
FIG. 4 is a layout of the 1-pixel segment on a glass substrate.

FIG. 3 is a detailed circuit diagram showing 1-pixel segment taken from the pixel array unit 21, and FIG. 4 is a layout of the 1-pixel segment on a glass substrate. As shown in FIG. 4, each of the pixels in this embodiment is approximately foursquare in shape.

As can be seen in FIG. 3, each pixel includes a pixel TFT 31, a display control TFT 32 for controlling whether or not to accumulate the electric charge in an auxiliary capacitor Cs, an image acquisition sensor 33, a capacitor C1 for storing detection results from the image acquisition sensor 33, a SRAM 34 for storing binary data corresponding to the electric charge stored in the capacitor C1, and an initializing TFT 35 for storing the initial electric charge in the capacitor C1.

The luminance of each pixel is gradually controlled by controlling transmittance of a liquid crystal layer sandwiched between the image electrode and the common electrode, based on a difference between a potential of the image electrode in accordance with the electric charge accumulated in the auxiliary capacitor Cs and a potential of the common electrode formed on the opposite substrate.

FIG. 3 shows an example in which any single pixel includes the single image acquisition sensor 33, but the number of the image acquisition sensor 33 should not particularly be limited. The pixel having an increased number of the image acquisition sensors 33 attains an enhanced resolution of the acquired image.

Upon initializing the capacitor C1, the pixel TFT 31 and the initializing TFT 35 are turned on. Upon loading (overwriting) the auxiliary capacitance Cs with analog voltage (analog pixel voltage) to determine the luminance of the display element, the pixel TFT 31 and the display control TFT 32 are turned on. Upon refreshing the capacitor C1, both the initializing TFT 35 and a data retaining TFT 36 in the SRAM, 34 are turned on. When the voltage of the capacitor C1 is close to a level of the supply voltage (5V) of the SRAM 34, a bit of leak hardly affects the 5V voltage resulted from the refreshing, or otherwise, when the voltage of the capacitor C1 is close to the ground voltage (0V), the result of the refreshing is 0V. So far as both the TFTs 35 and 36 are turned on, a data value in the SRAM 34 is considerably stable and continually unchanged. Even if either of the TFTs 35 and 36 is turned off, the data value of the SRAM 34 is still retained if the potential leak from the capacitor C1 is small. If the refresh is conducted after the potential leak of the capacitor C1 increases and before data value changes, it is possible to retain the data value of the SRAM 34. When the image pickup data stored in the SRAM 34 is to be transferred to the signal line, both the pixel TFT 31 and the data retaining TFT 36 should be turned on.

The display device of this embodiment can perform ordinary display operation and image acquisition similar to a scanner. When performing the ordinary display operation, the TFTs 35 and 36 are turned off so as not to store effective data in a buffer. In this case, the signal lines are supplied with signal line voltages from the signal line drive circuit 22, a display is conducted in accordance with the signal line voltages.

Figure 5:
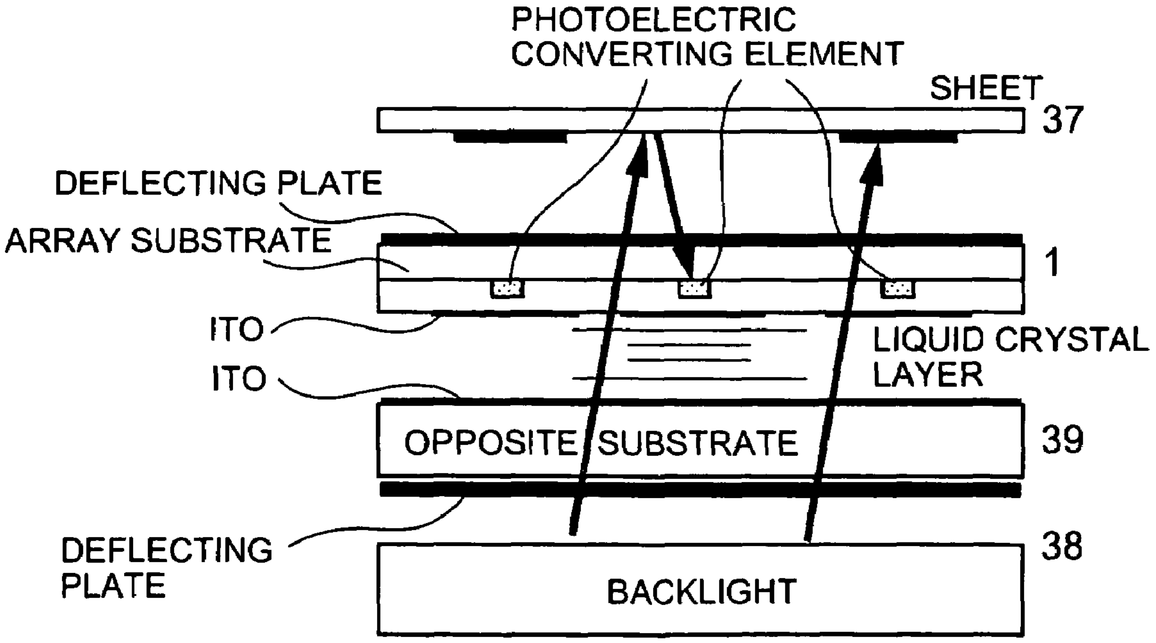
FIG. 5 is a diagram explaining a method of image acquisition.

On the other hand, when performing the image acquisition, an object for image acquisition (e.g., a sheet of paper) 37 is disposed on an upper face of the LCD substrate 1 as shown in FIG. 5. Beams from the backlight 38 are illuminated on the sheet 37 through the opposite substrate 39 and the LCD substrate 1. The light reflected by the sheet 37 is received by the image acquisition sensor 33 on the substrate 1 to acquire the image. In such a case, it is preferable that the glass substrates and the deflecting plates in proximity to the object or the sheet are as thin as possible. It is desirable to thin the glass substrate and a deflecting plate so that an interval between the sensor and the sheet such as a business card becomes not more than 0.3 mm in order to read a business card and so on. Typically, the sheet of paper diffusively reflects light, and it causes the illuminating beams to considerably scatter. With the glass substrates of considerable thickness placed in proximity to the object, a distance from a light receiving unit of the image acquisition sensor to the sheet is increased, and the reflected beams tend to diffuse into the image acquisition sensor of any adjacent pixel, which causes the acquired image to get blurred. The Blur occurs by the distance between a sensor receiver and the sheet. That is, it is possible to resolve the distance between the sensor receiver and the sheet.

The image data acquired in this manner are, once stored in the SRAM 34 as recognized in FIG. 3, transferred to the LCDC 2 in FIG. 1 via the signal line. That is, the SRAM 34 has a function for converting the signal of the sensor binary data (conducting A/D conversion) and a function for amplifying the sensor signals in order to output it from the pixels to outside. The LCDC 2 receives digital signals from the display device of this embodiment and carries out arithmetic operations such as permutation of the data and elimination of noise from the data.

Figure 6:
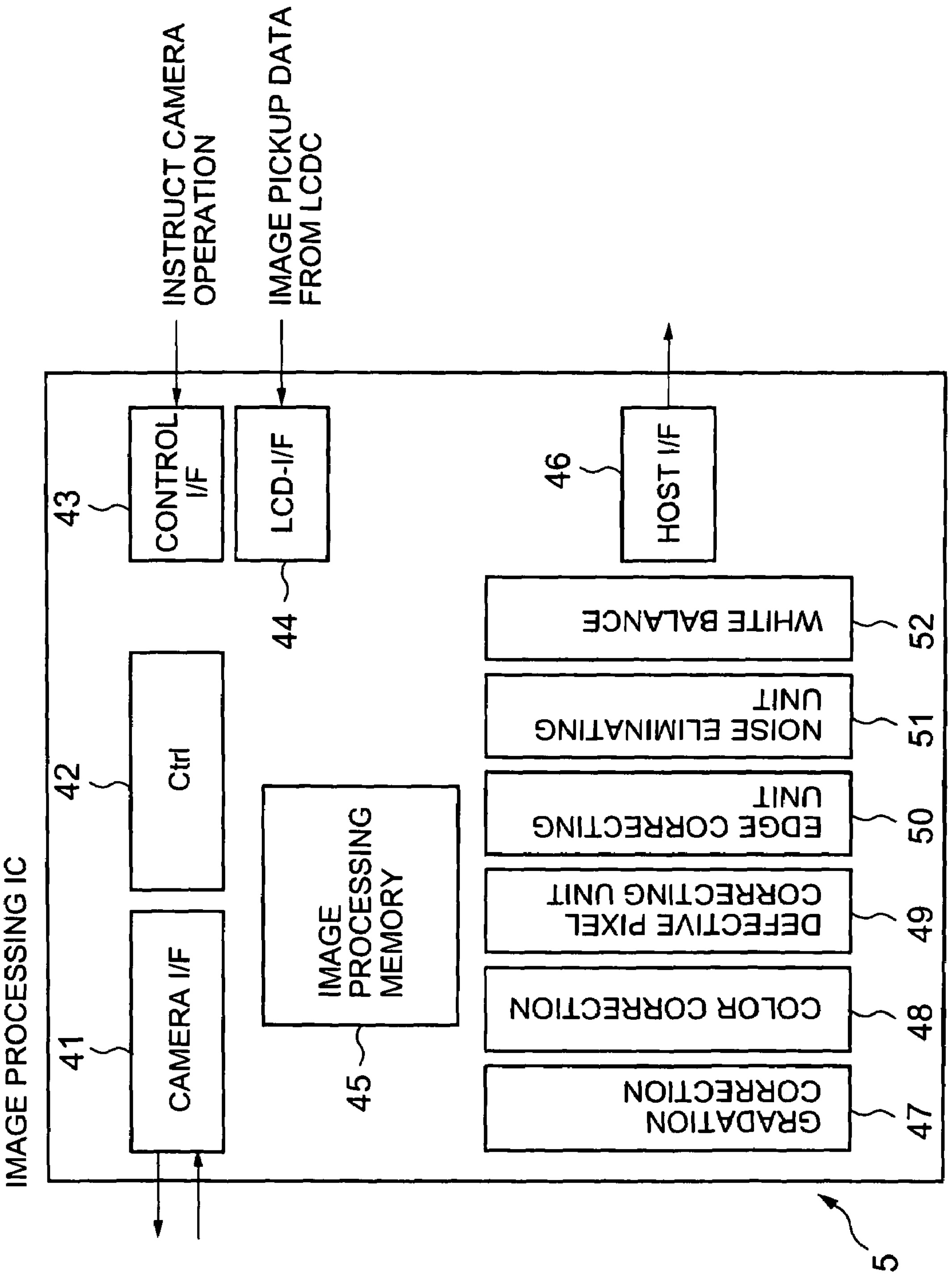
FIG. 6 is a block diagram showing an internal configuration of the image processing IC 5.

FIG. 6 is a block diagram showing an internal configuration of the image processing IC 5. The image processing IC 5 in FIG. 6 consists of a camera I/F unit 41 receiving the data of the picture taken by the camera 4, a control unit 42, a controller I/F unit 43 for controlling the operation of the camera 4, an LCD-I/F unit 44 for receiving the image pickup data from the LCDC 2, an image processing memory 45 for storing the image pickup data, a host I/F unit 46 for communicating control signals to and from the CPU 11, a gradation correcting unit 47 for correcting the gradation of the image pickup data, a color compensating unit 48 for correcting the color of the image pickup data, a defective pixel correcting unit 49, an edge correcting unit 50 for correcting the edge of the image pickup data, a noise eliminating unit 51 for removing noise from the image pickup data, and a white balance correcting unit 52 for adjusting the white balance of the image pickup data. The image processing IC of this embodiment is different from the prior art image processing IC in that it is provided with the LCD-I/F 44 in order to receive the image pickup data.

The display on the LCD substrate is conducted in principal under the instruction and the management of the base band LSI 3. For instance, when the base band LSI 3 receives the image pickup data from the camera 4, the base band LSI 3 outputs the image pickup data to the LCDC 2 at a predetermined timing. After receiving the image pickup data of the camera 4 from the base band LSI 3, the LCDC 2 stores them in the frame memory 16. If a sequence of the image pickup data of the camera 4 are intermittently transferred from the base band LSI 3, the LCDC 2 outputs to the LCD substrate 1 the image pickup data for full screen received from the camera 4 and stored in the frame memory 16 at the predetermined timing. The LCD substrate 1 converts the image pickup data from the LCDC 2 into the analog pixel voltage in order to load (overwrite) the signal line with the voltage.

Figure 7:
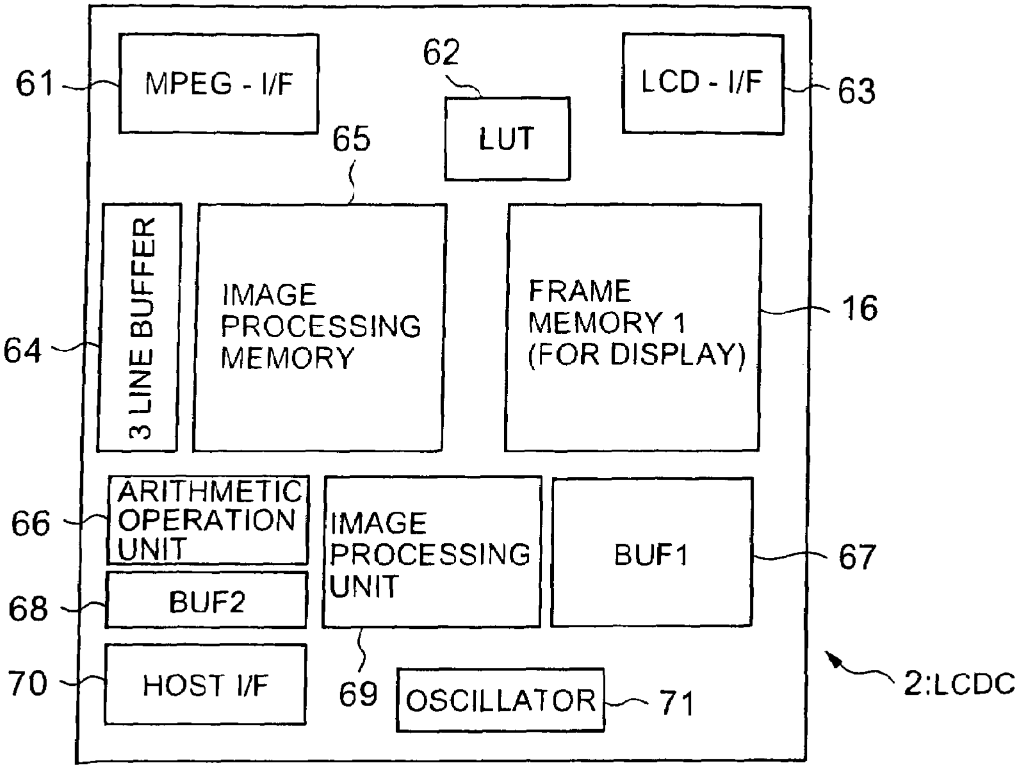
FIG. 7 is a block diagram showing an example of an internal configuration of the LCDC 2.

FIG. 7 is a block diagram showing an example of an internal configuration of the LCDC 2. The LCDC 2 in FIG. 7 consists of an MPEG-IF 61, an LUT (lookup table) 62, an LCD-I/F 63, a line buffer 64 for storing the image pickup data, an image processing memory 65 for saving the image pickup data from the LCDC 2, the frame memory 16 for saving the digital image data for display, an arithmetic operation unit 66, a first buffer 67, a second buffer 68, an image processing unit 69, a host I/F 70, and an oscillator 71.

Figure 8:
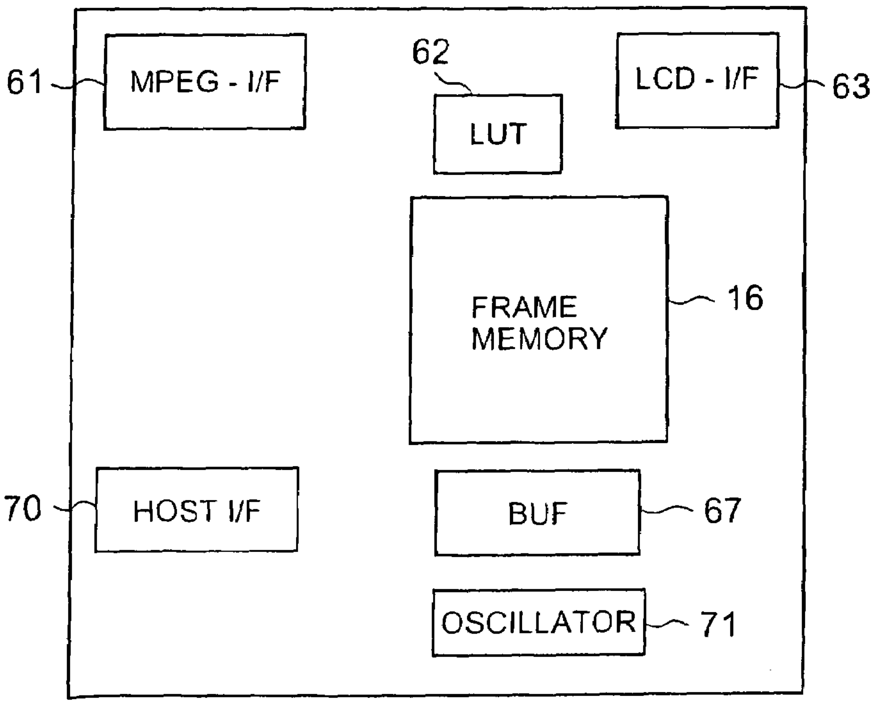
FIG. 8 is a block diagram showing an internal configuration of the prior art LCDC 2.

In contrast, FIG. 8 is a block diagram showing an internal configuration of the prior art LCDC 2. As can be seen, the prior art LCDC 2 has the MPEF-I/F 61, the LUT 62, the LCD-I/F 63, the frame memory 16, the buffer 67, and the oscillator 71.

In the prior art, upon displaying animation pictures, MPEF codec signals received through the MPEG-IF are usually converted into RGB data by referring to the LUT 62, and the resultant data are stored in the frame memory 16. Upon displaying texts, pictorial commands given from the CPU 11 via the host I/F 45 are converted into the RGB data, and the resultant data are stored in the frame memory 16. The oscillator 71 produces reference clocks as required. When the cellular phone is in a standby state, for example, namely, when the CPU is being suspended and a waiting call screen has to be displayed, the LCDC 2 continuously routinely sends the pixel data for display from the LCDC 2 to the LCD substrate 1 in sync with the reference clocks.

The LCDC 2 changes the order of the digital image data read out from the frame memory 16, for example, one line by one line in sequence from a first line of the display screen, to output it in the LCD substrate 1.

The LCDC 2 of this embodiment, as shown in FIG. 7, includes the image processing memory 65 unlike the prior art LCDC 2, and it saves the image pickup data from the image acquisition sensor 33, which is supplied from the LCD substrate 1 through the LCD-I/F 43. The image pickup data from the image acquisition sensor 33 is supplied to the image processing IC 5 through the host I/F unit 45 and the base band LSI 3.

Each of the pixels in the LCD substrate 1, which must ensure the sufficient aperture rate, has only a restricted space for disposing the image acquisition sensor 33 and other peripheral circuits. With the reduced aperture rate, the backlight has to attain the greater luminance to satisfy the requirement for the normal display on the screen, and this adversely leads to an increase in the power consumption for the backlight. It is desirable that each pixel has the image acquisition sensor 33 and other associated circuits as small as possible in number. When there is only one image acquisition sensors 33, if it is possible to precisely pick up a subtle variation in the potential of the capacitor C1, the image differentiated in multi gradations can be successfully realized, but it is a hard task. The reason is because the TFT and the image acquisition sensor formed on the glass substrate have differences which cannot be ignored with respect to the operational threshold and so on, even if they are formed on the same substrate. One solution to this is to provide each pixel with a variation compensating circuit, but the variation compensating circuit itself occupies a certain area, thereby deteriorating the aperture rate. Accordingly, in order to perform the image acquisition in multiple gradation, without providing multiple image acquisition sensors 33 and a complicated compensation circuit in the pixel, image pickups at multiple times are conducted while changing the image pickup condition, and the processing for multiple gradation and the processing for noise compensation are conducted based on these data.

Figure 9:
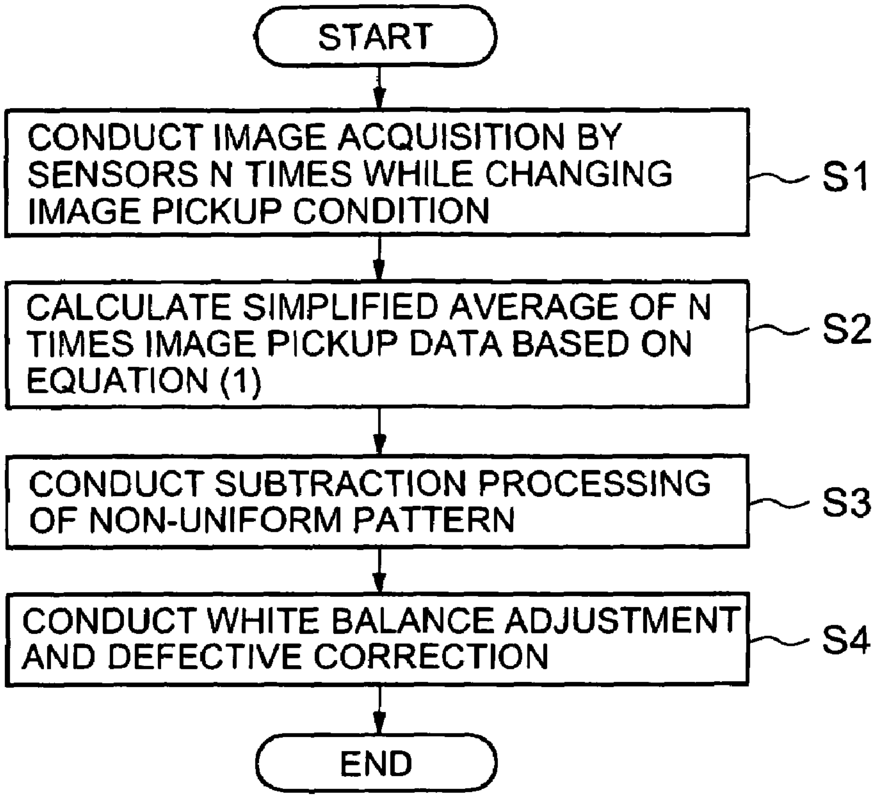
FIG. 9 is a flow chart showing the image acquisition procedure of the LCDC 2.

FIG. 9 is a flow chart showing the image acquisition procedure of the LCDC 2. First, while varying the image pickup conditions, the image acquisition is carried out N times by the image acquisition sensor 33 (Step S1). Then, a simple average of the N sets of the image pickup data is obtained based on the following equation (1) (Step S2).

$$L(x, y) = \frac{1}{N}\sum_{i=1}^{N} L(x, y)_i \tag{1}$$

where $L(x,y)_i$ is the i-th gradation value of coordinates (x,y).

Figure 10:
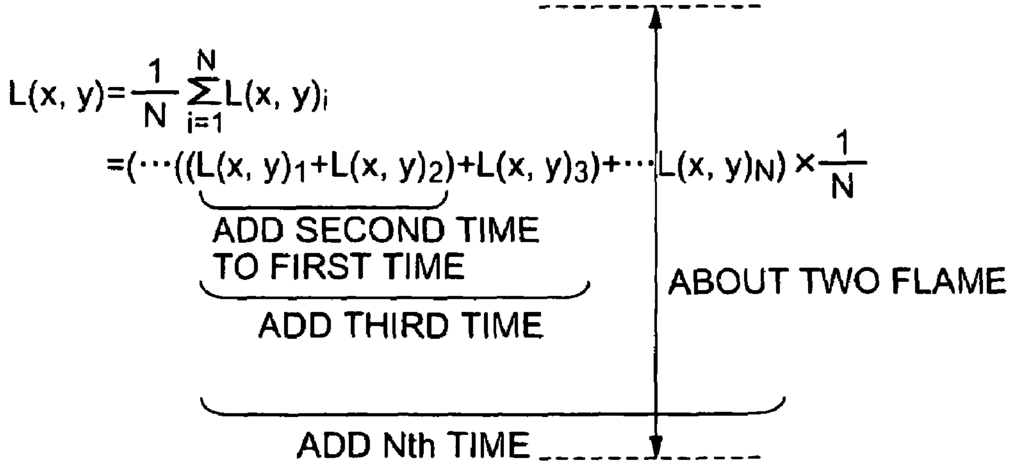
FIG. 10 is a diagram explaining a sequential addition method.

Upon conducting Steps S1 and S2, as shown in FIG. 10, the gradation value at the i-th image acquisition is sequentially added till i reaches N, and after the N-th image acquisition is completed, the total of the gradation values is divided by N. The image pickup data on which the sequential addition has already been done does not have to be saved any longer.

When conducting the sequential addition as shown in FIG. 10, the frame memory 16 needs memory capacity capable of storing the image pickup data as much as twice image pickup, thereby reducing memory capacity.

Next, a subtraction processing of a non-uniform pattern is carried out (Step S3). After that, adjustment of white balance, defective correction and so on are conducted (Step S4). Besides, while changing the image pickup condition little by little, the image pickup is conducted N times. There is a method in which if (1−i) times are black, and (i+1−64) times are white, “i gradation” is set.

FIG. 11 is a diagram illustrating transmission/reception of the signal between the signal line drive circuit 22, the scanning line drive circuit 23, the image acquisition sensor control circuit 24, and the signal processing/outputting circuit 25 on the LCD substrate 1, the LCD2 the base band LSI 3.

FIG. 12 is a block diagram showing detailed configurations on the glass substrate. The pixel array unit 21 of the present invention has a display resolution with the matrix of 320 lateral pixels×240 longitudinal pixels. The backlight is illuminated in sequence of red, blue and blue. It is called as a field sequential drive. In the field sequential drive, the backlight is illuminated also by white, beside red, green and blue. Each of the pixel is provided with the signal line and the scanning line. The total of the signal lines is 320 and that of the scanning line is 240.

The scanning line drive circuit 23 includes a 240-stage shift register 71, a 3-choice decoder 72, a level shifter (L/S) 73, a multiplexer (MUX) 74, and a buffer 75.

The signal processing/outputting circuit 25 has 320 precharging circuits 76, a 4-choice decoder 77, a 80-stage shift register 78 having every tenth stage of the register connected to a data bus, and 8 output buffers 79.

Figure 13:
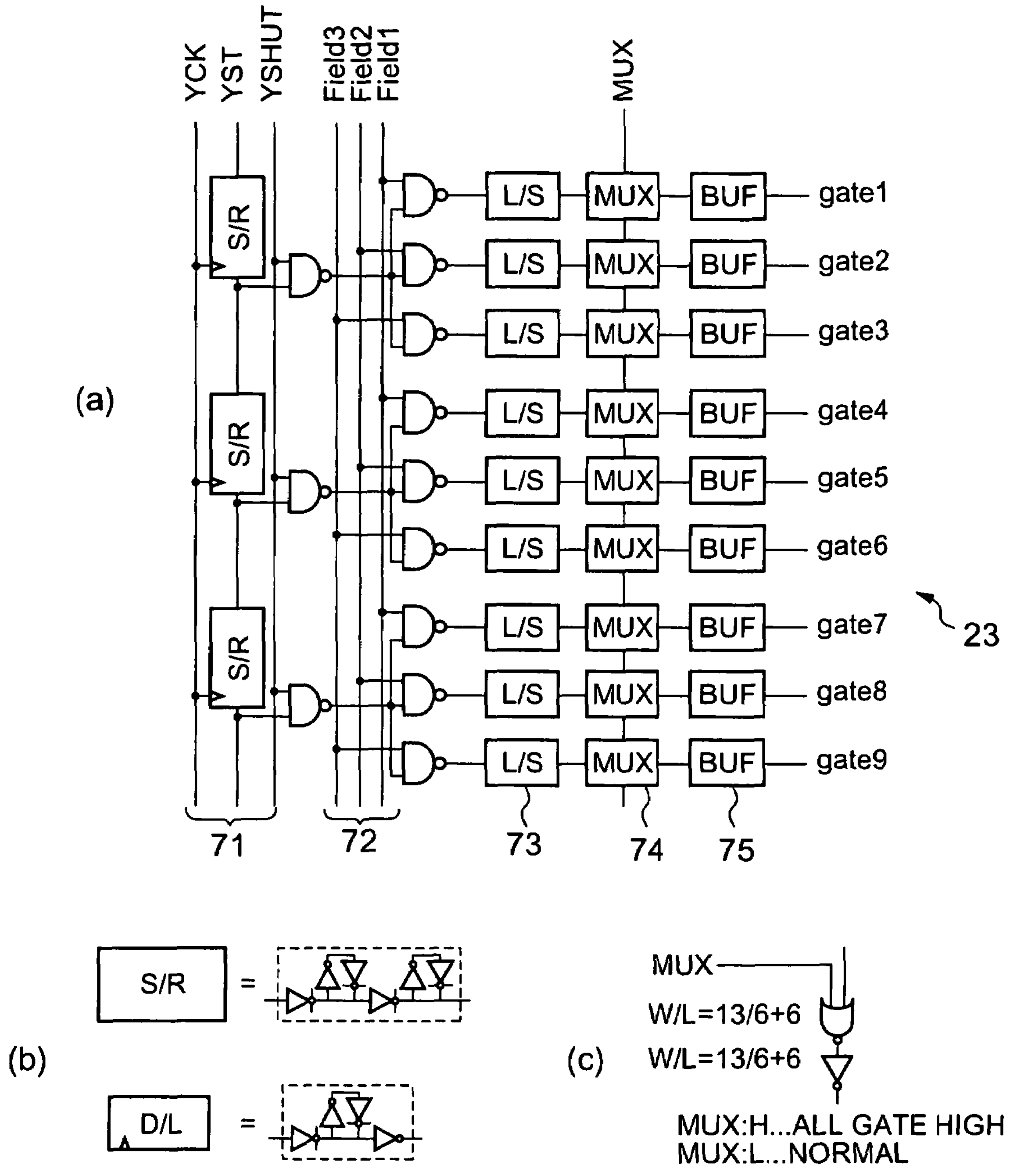

FIG. 13A is a circuit diagram showing an internal configuration of the scanning line drive circuit 23 in FIG. 12. The scanning line drive circuit 23 in FIG. 13 has a 240-stage shift register 71, a 3-choice decoder 72 provided corresponding to every set of three adjacent scanning lines, a level shifter (L/S)73 provided corresponding to every scanning line, a multiplexer (MUX) 74, and a buffer (BUF) 75.

Each of component registers in the shift register 71 has a circuit configuration as illustrated in FIG. 13B while the MUX 74 has a circuit structure as in FIG. 13C.

The 3-choice decoder 72, upon receiving one of control signals Field 1, Field 2 and Field 3, selects one from the three adjacent scanning lines, and thus, it can activate every third one of the 240 scanning lines. For instance, when Field [1:3] =(H, L, L) is satisfied, the scanning lines are activated in order as in G1, G4, G7, . . . , and so forth, or otherwise, when Field [1:3]=(L, H, L) is true, the scanning lines are activated in order as in G2, G5, G8, . . . , and so forth.

By driving the scanning lines in this manner, it is possible to detect an averaging gradation of the whole display screen (i.e., a rate of white pixels to the number of pixels in unit) in a shortened period of time. Thus, after driving every third scanning line, the shooting result is read out from the image acquisition sensor 33 corresponding to the driven scanning line to compute the averaging gradation, and it is determined from the computation result if the remaining image acquisition sensors 33 should be accessed to get the shooting result from them or if the image pickup conditions should be changed to take a picture again, which is useful to avoid the acquisition of image pickup data produced under inadequate image pickup conditions. This works effectively to shorten the period of time till the shooting result is eventually displayed.

The MUX 74 switches the operation mode between turning on every single scanning line and simultaneously turning all the scanning line on. The reason of turning on all the scanning lines at the same time is because of accumulating the initial electric charge in the capacitor C1 for storing the image pickup result of the image acquisition sensor 33 at the same time.

In this way, by providing the MUX 74, it is unnecessary to provide a dedicated TFT which switches whether or not to accumulate the initial electric charge in the capacitor C1, thereby reducing the circuit volume.

FIG. 14 is a block diagram showing an internal configuration of the signal processing/outputting circuit 25 in FIG. 11. The signal processing/outputting circuit 25 permits 320 image acquisition sensors 33 to output signals in batches serially through eight buses. More specifically, the signal processing/outputting circuit 25 has P/S converting circuits 91 provided corresponding to every fortieth signal line, output buffers 92, and a synchronizing signal generating circuit 93.

FIG. 15 is a block diagram showing an internal configuration of the synchronizing signal generating circuit 93. As can be seen in FIG. 15, the synchronizing signal generating circuit 93 has a NAND gate 94 and a clock controlled D-F/F 95, and the D-F/F 95 is followed by an output buffer 92 connected in the succeeding stage. In the combination circuitry of devices such as the NAND gate on the LCD substrate 1, non-uniform properties of the TFTs cause the output signals to be considerably out of phase with the output data to an extent that the output signals can no longer serve as synchronizing signals. Thus, as shown in FIG. 15, it is desirable that the clock controlled D-F/F 95 is provided on the insulation substrate to reduce the phase difference from the clocks on the insulation substrate. A level conversion circuit may be provided in order to convert the output amplitude into the interface voltage of the outside LSI.

FIG. 16 is a block diagram showing detailed configurations of the P/S converting circuit 91 in FIG. 14. As shown in FIG. 16, the P/S converting circuit 91 includes a 4-input-1-output decoder 96, a latch 97, and a 10-stage shift register 98. The decoder 96 has a circuit configuration as shown in FIG. 17. The latch 97 has a circuit structure as in FIG. 18. Clocks used to control the shift register 98 are shared to control the D-F/F, and this enables a reduction of the phase difference between the data and the synchronization signals.

FIG. 19 is a block diagram showing particulars of the output buffer 92. As can be seen, the buffer 92 has a plurality of buffers (inverters) 93 connected in series. Those placed in the latter stages can have greater channel widths of TFTs in the inverters and ensure the driving force required for external loads (e.g., flexible cable (FPC) ).

FIG. 20 is a diagram illustrating the operation of the display device of this embodiment, FIG. 21 is a timing chart at the normal display period, FIG. 22 is a timing chart at pre-charging and image pickup periods, and FIG. 23 is a timing chart at image data output period.

During the normal display period, the operation in a mode M1 in FIG. 20 is performed. The luminance of the whole pixels are set to a predetermined value (so as to attain the highest liquid crystal transmissivity). In this case, as shown in FIG. 21, after the scanning lines G1, G4, G7 and the succeeding lines are sequentially activated till image data is displayed in part to cover one third of the screen, the scanning lines G2, G5, G8 and the succeeding lines are sequentially activated till the image data is displayed also in part to cover another one third of the screen, and eventually, the scanning lines G3, G6, G9 and the succeeding lines are sequentially driven till the remaining image data is displayed in the remaining one third of the screen. After that, the backlight is illuminated with a specific color. In this embodiment, first white luminescent color is illuminated.

Then, the operation is switched to a mode m2 where after pre-charging the capacitors C1 of all the pixels (loading with the initial electricity), a picture is taken. During the procedure, as shown in FIG. 22, the capacitors C1 of all the pixels are loaded (overwritten) with 5V while the scanning line drive circuit 23 drives all the scanning lines. Because the capacitors C1 of all the pixels are pre-charged at the same time, it is possible to shorten time necessary for pre-charging.

Next, in a mode m3, part of the image pickup data (equivalent to one twelfth of the whole screen) is output. Specifically, turning the given scanning lines on depending upon a shift pulse from the scanning line drive circuit, those scanning lines are loaded with the data stored in the SRAM 34 associated with the part of the text or image. In this case, as shown in FIG. 23, first the image acquisition sensors 33 in the pixels connected to the scanning lines G1, G4, G7 and the succeeding lines output their respective image pickup data to the signal lines. The remaining image pickup data (eleven twelfth of the whole screen), i.e. data which is held in the latch 97 and is not outputted, among the image data of the image pickup sensor 33 in the pixels connected to the scanning lines G1, G4, G7 and the like is outputted in mode m4. Further, the image pickup data of the image acquisition sensor 33 in the pixels connected to the scanning lines G2, G5, G8 and the like, and the scanning lines G3, G6, G9 and the like are outputted to the signal lines in mode m4 (These data would not be output in the mode m3).

The image pickup data outputted to the signal lines are held in the latch circuit 97 in the P/S converting circuit 91 in FIG. 16. Determining that HSW[3:0] equal (1,0,0,0) permits data from one of the four latch circuits 97 to be overwritten in the shift register. The series of the shift registers are activated by clock control (HCK drive) to sequentially produce signals.

First of all, the 1st, the 5th, the 9th and some other columns of data among all the data in the 1st to the 238th columns are output. The output data are equivalent to one twelfth of the entire image data. From the data output so far, the averaging gradation $L_{mean}$ is calculated. During the procedure, the LCDC 2 and its associated device units count the averaging gradation $L_{mean}$. The LCD/I/F unit 44 of the LCDC 2 is provided with a counter not shown, a memory for storing the averaging gradation and a determination reference value concerning a difference of the averaging gradation, a logic circuit for calculating the difference of the averaging gradation and a comparator for comparing the difference of the averaging gradation with the determination reference value.

It is determined if the averaging gradation of the one twelfth of the entire pixel data is saturated (Step S11), and if so, the data output is interrupted to commence the image processing (in a mode m5).

Then, it is determined if the obtained averaging gradation is too small (Step S12), and if so, the next image pickup time is extended to T+2×ΔT to repeat the processings subsequent to the mode m2. If not, it is further determined if the averaging gradation is excessive (Step S13), and if so, the next mage pickup time is. shortened to T+0.5×ΔT to repeat the processings subsequent to the mode m2. If not, the operation switches to the mode m4 to continually output the remaining eleven twelfth of the data.

The procedures of the operation modes m1 to m4 are repeated till the averaging gradation is saturated.

In the mode m5, averaging the image pickup data thus obtained enables the gradation information on while color components to be compiled.

In the mode m5, similarly, green and blue color components are compiled. A choice from white, green, and blue depends upon which luminescent color should be used for the backlight (LED). When the backlight is illuminated with white color, it is possible to use white LED. Or the white color may be formed by illuminating three kinds of LEDs of red, green and blue colors.

When the backlight is illuminated with red color, the image pickup can be skipped. By subtracting the generated blue and green components from the generated white color component, it is possible to generate the red color component. Photoelectric current in the image acquisition sensors 33 causes wavelength dispersion, and in case that the image pickup time should be lengthened to detect red color, it is possible to avoid a problem in which the whole image pickup time lengthens.

When the gradation information for each of red, green and blue colors are obtained by the aforementioned method, the resultant composite colors are overlaid one another to compose a colored image. The colored image is stored in the image memory and also transferred to the image processing IC 5 via the base band LSI 3. Treatments of the general purpose image processing (i.e., gradation correction, color correction, defective image compensation, edge correction, noise elimination, white balance correction, etc.) are carried out, and once the results are stored in the frame memory 16 in the LCDC2 in the predetermined procedures to display them later, they are produced from the LCDC 2 in a given format and then displayed on the LCD screen.

FIG. 24 is a flow chart illustrating the processing operation of the LCD 2. Among the operations of the whole display device described in FIG. 20, the processing operation conducted by the LCDC 2 upon the image pickup is extracted. The LCDC 2 gives a command to the image acquisition sensors 33 to take a picture in the image pickup time determined by T=T+ΔT (Step S21). Then, the image pickup data from the image acquisition sensors 33 are taken out in a combing manner where the data from the pixels in the lateral arrays are transferred through every m-th signal line while those in the longitudinal arrays are transferred through every n-th scanning line (Step S22). In this way, the image pickup data can be taken from one M-th (M=m×n) of the entire pixels, and the results are used to compute the averaging gradation $L_{mean}$ of the image pickup data. (Although examples where m=4 and n=3 have been described in the context of the aforementioned embodiment, m and n are not limited to the precise values.)

Then, it is determined if the averaging gradation $L_{mean}$ is below the given reference value (e.g., 64) (Step S23). If so, it is further determined if the difference from the averaging gradation $L_{mean0}$ of the image pickup data immediately before the current one exceeds a given reference value ΔH0 (Step S24). If so, it is additionally determined if the difference is smaller than another given reference value ΔH1 (Step S25). If so, the image pickup data is sequentially taken from the remaining image acquisition sensors 33 in the pixels to add the newly obtained data to the existing data stored in the image processing memory 65 (Step S26). Next, after incrementing the accumulated number of times A of the image acquisition by one (Step S27), the processings subsequent to the Step S21 are repeated.

On the other hand, when the determination is determined to be less than a reference value ΔH0 in step S24, or the difference is more than ΔH1 in step S25, the processing returns in step S21.

When the determination at Step S23 is that the averaging gradation $L_{mean}$ exceeds 64, the gradation value L(x,y) of the pixel positioned in the coordinates (x, y) is obtained from the formula (2) as follows:

$$L(x,y)=L(x,y)/A \quad (2).$$

Thus, in this embodiment, the image pickup data from the image acquisition sensors 33, which are binarized, are transferred from the LCD substrate 1 to the LCDC 2, and the LCDC 2 processes each of the binarized data produced in several image pickup conditions to generate the image pickup data differentiated in multi gradations, which are sent to the image processing IC 5 to undergo the general purpose image processing treatments such as gradation correction and color compensation. In this way, all the treatments to the image pickup data of the image acquisition sensors 33 are not carried out by the LCDC 2, but part of the image processing is performed by the image processing IC 5 that is usually dedicated to the image pickup data derived from the camera 4, and hence, the configuration of the LCDC 2 can be simplified. Also, according to this embodiment, it is unnecessary to provide multiple IC chips which conduct the same processings in the portable phone, thereby reducing chip area and lowering cost of the whole portable phone.

Moreover, in this embodiment, instead of capturing red color in which it takes long time to pick up image, the red color component is generated based on the image pickup result of white, green and blue. Accordingly, not only the total image pickup time but the time from the image pickup till displaying the resultant image can be shortened.

Further, in this embodiment, the averaging gradation is obtained from the image pickup results from the image acquisition sensors 33 connected to part of the scanning lines and part of the signal lines, and hence, the averaging gradation can be computed in a reduced time, and eliminated is the useless task of producing all the image pickup results from the image acquisition sensors 33 taken under some image pickup conditions inadequate to computing them for the averaging gradation. Thus, the averaging gradation can accurately be computed in the reduced time.

Although, in this embodiment, an LCD processing data by means of the field sequential drive has been described, any of the ordinary LCDs that are well-known in the art may be similarly used in an application where a single pixel is divided into three sub-pixels and color filters R, G and B are provided to display the image. Also, an organic EL display device which has pixels each provided with an LED may be applied to this embodiment. This embodiment is applicable not only to the cellular phone but similarly to portable information terminals such as a PDA (personal data assistant) and a mobile PC.

In this embodiment, although three composite colors of "white, green and blue" are used to attain eventual composite colors of "red, green and blue", the attainable composite colors include more variations. It is possible that three composite colors of "cyan, magenta, and yellow" are used to attain eventual composite colors of "red, green and blue". The backlight for the LED may develop luminescent colors of cyan, magenta, and yellow, and this may be attained by lighting up luminescent colors of red and green, green and blue, and blue and red, as well.

In order to compute the averaging gradation, a counter may be incorporated in the LCD substrate to use data bus for data outputs, or otherwise, the LCDC and its component device units may be substituted for the counter upon receiving the image pickup data.

EMBODIMENT 2

A second embodiment of the present invention also relies upon the feature called field sequential drive where the backlight has a set of luminescent colors lit up in a repetitive sequence of red, green and blue. In such a case, an observer visually perceives as if multi-color images were displayed.

A structure of a single pixel unit in the second embodiment is similar to that in FIG. 3. As shown in FIG. 3, the single pixel includes merely a single image acquisition sensor 33, thereby attaining a sufficient aperture rate. Thus, as will be recognized from the layout in FIG. 25, each pixel leaves a sufficient vacant area surrounding a patch of the image acquisition sensor 33, and the image acquisition sensor 33 may be omnidirectionally displaced within a confinement of the single pixel.

In view of this noteworthy point, as shown in FIG. 26, according to the present embodiment, the image acquisition sensors 33 in the pixels may be deployed in a zigzag formation along the lateral extensions of the array. Specifically, the image acquisition sensors 33 in the laterally adjacent pixels are alternately out of alignment to each other. In this manner, the image acquisition sensor 33, although not in position defined by broken line (not in a position of the virtual image acquisition sensor 33), gives the image pickup data derived from the very position by computing it from the image pickup data obtained from the image acquisition sensors 33 in four of the surrounding pixels.

FIG. 27 is a block diagram showing an internal configuration of the LCDC 2 in the second embodiment. In comparison with FIG. 7, the LCDC 2 in FIG. 27 has 3 line buffers 64*a*. The three line buffers 64*a* respectively store the image pickup data from the image acquisition sensors 33 as much as retained by the adjacent three lines. For example, described in conjunction with FIG. 28 will be a case where both the actual image pickup data buffered in n lines and the virtual image pickup data are produced. Assume now that the three line buffers 64*a* store the image pickup data derived from the image acquisition sensors 33 and buffered in (n−1) lines, n lines, and (n+1) lines, respectively. In such a case, as shown in FIG. 28, the arithmetic operation unit 66 obtains and averages the image pickup data derived from the actual image acquisition sensors 33 and buffered in the n lines, the (n−1) lines and the (n+1) lines, respectively, to compute the virtual image pickup data buffered in the n lines and store the computation results in the buffer 68. Specifically, an average value of the data from the four pixels omnidirectionally surrounding the virtual image acquisition sensor is regarded as a value of the virtual image acquisition sensor. The image pickup data permutated in the buffer 68 is transferred to the base band LSI 3 via the host I/F 70. The base band LSI 3 transfers the image pickup data to the image processing IC 5 so that the image processing IC 5 can execute various types of the image processing.

The image processing IC 5 cannot distinguish the image pickup data of the actual image acquisition sensor 33 from the image pickup data of the virtual image acquisition sensor 33, and hence, it processes images without discriminating both the image pickup data. Accordingly, this embodiment apparently attains similar effects to an application where the number of the image pickup sensors 33 is doubled along both the lateral and longitudinal extensions of the array. Thus, the second embodiment can double the resolution of the acquired image, compared with the first embodiment. In an application where a finger print of a user read from the display screen is transferred to a remote host computer via a communication system associated with the cellular phone so as to determine (authenticate) the user as a right person to proceed with the online banking, it is possible to improve the accuracy of the authentication because the pickup image is high resolution.

Also, since the data output unit of the LCDC includes an arithmetic operation unit to compute a value from the virtual image acquisition sensor, there is no need for the LCDC to increase the image processing memory any longer.

The image acquisition sensors in the pixels are in zigzag deployment in the aforementioned embodiment, but various other variations can be envisioned. It should be noted that along one lateral or longitudinal extension of the array, the light receiving elements of the image acquisition sensors are not aligned in simple straight line. The adjacent sensors may be alternately positioned in more than two separate lines. As the calculation method of the virtual image, various changes is possible. It is assumed to conduct the calculation taking the frequency component of the surrounding pixels into consideration.

The aforementioned embodiments all focus the applications to the liquid crystal display according to the present invention. The present invention may be applied to any type of a flat display device having an image acquisition function.

EMBODIMENT 3

A third embodiment of the present invention relates to system configuration. FIG. 29 is a conventional block diagram. No signal is transmitted from the LCDC 2 to the CPU 11, or from the LCDC 2 to the image processing IC 5 of the camera 4. The image processing IC 5 conducts a prescribed image processing for the image pickup by the camera 4. The image data is transmitted to the CPU 11 in a prescribed format such as Yuv format. The CPU 11 transmits the image data to the LCDC 2 at a prescribed timing. The LCDC 2 transmits the digital image data to the LCDC at a prescribed timing, for example, by accumulating the image data transmitted from the CPU 11 to the frame memory. The LCDC conducts display operation based on the digital image data.

FIG. 30 is a diagram showing system configuration according to this embodiment. One feature of FIG. 30 is to have a bidirectional interface between the LCDC 2 and the CPU 11. The image pickup data is once stored in the memory of the LCDC 2, and transmitted to the image processing IC 5 via the CPU 11 based on instruction from the CPU 11, to conduct general image processings. Because the output format from the LCDC 2 coincides with the interface of the image processing IC 5, it is possible to use a general image processing IC 5. In this case, it is possible to change the host I/F to the LCD-I/F. It is possible to reduce cost because it is unnecessary to use the image processing IC 5. Configurations of the LCDC 2, the image processing IC 5 and the LCDC 1 are the same, description will be omitted.

EMBODIMENT 4

A fourth embodiment of the present invention relates to system configuration. FIG. 31 is a diagram showing system configuration according to this embodiment. One feature of FIG. 31 is to have a dedicated interface between the LCDC 2 and the image processing IC 5. The image pickup data is once stored in the memory of the LCDC 2, and directly transmitted to the image processing IC 5 based on "request from the image processing IC 51" or "instruction from the CPU 11", to conduct general image processing. When the image pickup data is transmitted to the image processing IC 5, the CPU bus is not occupied. Accordingly, large load is not imposed on the CPU 11. Since configurations of the LCDC 2, the image processing IC 5 and the LCD 1 are the same as those of the first, second and third embodiments, the explanation will be omitted.

What is claimed is:

1. A display device, comprising:

a pixel array unit having display elements formed in vicinity of intersections of signal lines and scanning lines arranged in length and breadth, image pickup unit and an output unit which outputs binary data corresponding to image picked up by said image pickup unit;

a image pickup device provided separate from said image pickup unit;

a first image processing unit configured to generate multiple gradation data based on multiple binary data picked up by said image pickup units based on multiple image pickup conditions;

a second image processing unit configured to receive either the image pickup data picked up by said image pickup device or the multiple gradation data generated by said first image processing unit, to conduct a prescribed image processing;

a display controller IC which embeds said first image processing unit and supplies digital pixel data for said pixel array unit to said pixel array;

a temporary storage capable of storing image pickup data of said image pickup unit for three horizontal lines; and a virtual image pickup display detector, wherein said pixel array unit is formed on an insulation substrate using TFTs (Thin Film Transistors), while said first image processing unit is transmitting the image pickup data stored in said temporary storage to said second image processing unit, the virtual image pickup data detector calculates the central image pickup data, and transfers the calculation result to said temporary storage, said first image processing unit is a semiconductor chip.

2. The display device according to claim 1, wherein said virtual image pickup detector averages the image pickup data, to calculate the central image data.

3. A display device, comprising:

display devices in pixels formed in vicinity of intersections of signal lines and scanning lines disposed in length and breadth;

image pickup units, at least one of said image pickup units being provided corresponding to each pixel, and each conducting image pickup at a prescribed range;

binary data storages which store binary data corresponding to results of image picked up by said image pickup unit;

a multiple gradation data generator which generates multiple gradation data with first, second third colors based on the binary data with the first, second and third colors picked up by said image pickup unit; and a color composition unit configured to generate image pickup data with a fourth color based on the multiple gradation data with the first, second and third colors, wherein said first, second and third colors are colors except red color, and the fourth color is red.

4. The display device according to claim 3, wherein the first color is white, the second color is green and said third color is blue, and said color composition unit calculates the multiple gradation data with red color based on the multiple gradation data with white, green and blue.

5. The display device according to claim 3, further comprising a backlight device capable of alternately illuminating the lights with the first, second and third colors, said backlight device being disposed on back face of an insulation substrate on which said display elements and said image pickup units are provided, wherein said image pickup unit repeatedly conducts image pickup with respect to the first, second and third colors of said backlight device.

6. The display device according to claim 3, wherein said image pickup unit repeatedly picks up the image on multiple image pickup conditions with respect to the first, second and third colors of said backlight device; and said image pickup unit repeatedly picks up image with respect to the cases where illumination color of said backlight are the first, second and third colors.

7. The display device according to claim 3, wherein each pixel is substantially square shape.

8. The display device according to claim 3, further comprising an averaging gradation estimation unit configured to estimate the averaging gradation of the whole display screen based on the binary data of the pixel data connected to a portion of the scanning lines which do not neighbor to each other and a portion of the signal lines which do not neighbor to each other.

9. The display device according to claim 8, further comprising:

a signal processing output circuit which converts the binary data for multiple pixels into serial data; and an output determination unit configured to determine whether or not to output the image pickup data of the remaining image pickup unit from said signal processing output circuit based on the estimation result of said averaging gradation estimation unit.

* * * * *